(12) United States Patent
Wiesenberg

(10) Patent No.: US 11,781,875 B2
(45) Date of Patent: Oct. 10, 2023

(54) APPARATUS AND METHOD FOR FORMING AND ANALYZING CONNECTED ROADS

(71) Applicant: TOYOTA MOTOR ENGINEERING & MANUFACTURING NORTH AMERICA, INC., Plano, TX (US)

(72) Inventor: Ryan M. Wiesenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 402 days.

(21) Appl. No.: 16/546,946

(22) Filed: Aug. 21, 2019

(65) Prior Publication Data
US 2021/0055119 A1   Feb. 25, 2021

(51) Int. Cl.
*G01C 21/34* (2006.01)
*G01C 21/32* (2006.01)
*B60W 40/06* (2012.01)
*B60W 50/08* (2020.01)
(Continued)

(52) U.S. Cl.
CPC ... *G01C 21/3461* (2013.01); *B60W 30/18163* (2013.01); *B60W 40/06* (2013.01); *B60W 50/08* (2013.01); *G01C 21/32* (2013.01); *B60W 2050/0072* (2013.01); *B60W 2552/00* (2020.02)

(58) Field of Classification Search
CPC ............... G01C 21/3461; G01C 21/32; G01C 21/3837; G01C 21/387; G01C 21/3815; B60W 30/18163; B60W 40/06; B60W 50/08; B60W 2552/00; B60W 2050/0072; G05D 1/0061; G05D 1/0088; G05D 1/021; G05D 1/0214; G05D 1/0221; G05D 1/0223
See application file for complete search history.

(56) References Cited

U.S. PATENT DOCUMENTS 4,812,990 A * 3/1989 Adams ................. G05D 1/0005
701/410
5,694,322 A * 12/1997 Westerlage .......... G06Q 40/123
340/870.07
(Continued)

FOREIGN PATENT DOCUMENTS

DE   19703436 A1 * 1/1998 ............. G01C 21/34
JP   4842059 B2 * 12/2011
(Continued)

OTHER PUBLICATIONS

Sekine H JP-4842059-B2 translation (Year: 2011).*

*Primary Examiner* — Angelina Shudy
(74) *Attorney, Agent, or Firm* — Oblon, McClelland, Maier & Neustadt, L.L.P.

(57) ABSTRACT

Aspects of the disclosure provide an apparatus and a method for forming and analyzing connected roads. The apparatus can include processing circuitry. The processing circuitry determines, based on a first map of a region having road segments, a second map having connected roads. One of the connected roads is formed by combining a plurality of the road segments and is longer than a threshold. The processing circuitry determines road complexity of one of the connected roads in the second map for route planning and/or testing.

16 Claims, 18 Drawing Sheets

(51) Int. Cl.
*B60W 30/18* (2012.01)
*B60W 50/00* (2006.01)

(56) References Cited

U.S. PATENT DOCUMENTS

| | | | | |
|---|---|---|---|---|
| 5,787,233 | A * | 7/1998 | Akimoto | G06Q 10/047 706/45 |
| 5,848,375 | A * | 12/1998 | Nunobiki | G01C 21/32 340/995.22 |
| 5,938,718 | A * | 8/1999 | Morimoto | G01C 21/3658 701/410 |
| 5,938,720 | A * | 8/1999 | Tamai | G01C 21/3446 701/411 |
| 5,978,732 | A * | 11/1999 | Kakitani | G08G 1/096827 701/425 |
| 6,178,380 | B1 * | 1/2001 | Millington | G01C 21/3673 |
| 6,438,561 | B1 * | 8/2002 | Israni | G01C 21/3492 455/457 |
| 6,459,387 | B1 * | 10/2002 | Kobayashi | B60Q 1/18 362/465 |
| 6,487,305 | B2 * | 11/2002 | Kambe | G01C 21/20 382/241 |
| 7,076,409 | B2 * | 7/2006 | Agrawala | G06T 17/05 703/2 |
| 7,197,500 | B1 * | 3/2007 | Israni | G01C 21/32 701/461 |
| 7,344,288 | B2 * | 3/2008 | Kobayashi | G01C 21/26 362/465 |
| 7,430,473 | B2 | 9/2008 | Foo et al. | |
| 7,440,875 | B2 * | 10/2008 | Cuthbert | G01C 21/343 703/2 |
| 7,957,893 | B2 | 6/2011 | Smartt | |
| 8,121,350 | B2 * | 2/2012 | Klefenz | G06T 7/13 348/148 |
| 8,583,355 | B2 * | 11/2013 | Fukumoto | B60W 40/06 701/467 |
| 8,626,437 | B2 * | 1/2014 | Yun | G08G 1/096838 701/410 |
| 8,983,769 | B2 * | 3/2015 | Ikeuchi | G01C 21/3837 701/450 |
| 9,036,509 | B1 * | 5/2015 | Addepalli | H04W 72/20 701/1 |
| 9,109,909 | B2 | 8/2015 | Schilling et al. | |
| 9,157,746 | B2 * | 10/2015 | Bruce | G01C 21/20 |
| 9,214,099 | B2 * | 12/2015 | Usui | G09B 29/106 |
| 9,261,376 | B2 * | 2/2016 | Zheng | G01C 21/3484 |
| 9,305,380 | B2 | 4/2016 | Sethia | |
| 9,482,543 | B2 * | 11/2016 | Shinagawa | G01C 21/3446 |
| 9,626,593 | B2 * | 4/2017 | Ahmed | G06V 20/176 |
| 9,773,321 | B2 * | 9/2017 | Hong | G06T 11/206 |
| 10,390,474 | B2 * | 8/2019 | Kelley | A01B 69/008 |
| 10,731,997 | B2 * | 8/2020 | Dong | G01C 21/32 |
| 11,168,993 | B1 * | 11/2021 | Tsoupko-Sitnikov | G01C 21/3407 |
| 11,176,845 | B2 * | 11/2021 | Stankoulov | G09B 19/167 |
| 11,280,609 | B2 * | 3/2022 | Chen | G06T 17/20 |
| 2001/0040984 | A1 * | 11/2001 | Kambe | G09B 29/106 382/113 |
| 2002/0183922 | A1 * | 12/2002 | Tomasi | G01C 21/20 701/533 |
| 2003/0231190 | A1 * | 12/2003 | Jawerth | H04N 19/00 345/660 |
| 2004/0044466 | A1 * | 3/2004 | Nesbitt | G01C 21/3453 701/533 |
| 2004/0205517 | A1 * | 10/2004 | Lampert | G01C 21/3863 715/255 |
| 2005/0246091 | A1 * | 11/2005 | Kuroda | G01C 21/3697 701/1 |
| 2005/0253738 | A1 * | 11/2005 | Kobayashi | G01C 21/26 340/988 |
| 2006/0085123 | A1 * | 4/2006 | Sugita | G01C 21/367 701/431 |
| 2006/0220923 | A1 * | 10/2006 | Tanizaki | G01C 21/36 340/995.1 |
| 2007/0106466 | A1 * | 5/2007 | Noguchi | G01C 21/3614 701/418 |
| 2007/0145184 | A1 * | 6/2007 | Baudry | G01C 23/005 244/76 R |
| 2008/0071465 | A1 * | 3/2008 | Chapman | G08G 1/0104 701/117 |
| 2009/0144331 | A1 * | 6/2009 | Witmer | G01C 21/32 |
| 2009/0299617 | A1 * | 12/2009 | Denaro | G01C 21/3697 707/999.107 |
| 2010/0138143 | A1 * | 6/2010 | Kanematsu | G06F 16/29 707/E17.014 |
| 2010/0329513 | A1 * | 12/2010 | Klefenz | G06V 10/48 348/148 |
| 2011/0112710 | A1 * | 5/2011 | Meyer-Ebeling | B60L 15/2045 903/902 |
| 2011/0112760 | A1 * | 5/2011 | Serbanescu | G01C 21/32 701/465 |
| 2012/0095682 | A1 * | 4/2012 | Wilson | G01C 21/32 701/532 |
| 2012/0128214 | A1 * | 5/2012 | Satoh | G01C 21/3819 382/113 |
| 2013/0054131 | A1 * | 2/2013 | Zhang | G01C 21/3446 701/410 |
| 2013/0138345 | A1 * | 5/2013 | Sakaguchi | G01C 21/3626 701/533 |
| 2013/0147846 | A1 * | 6/2013 | Kalai | G06F 3/147 345/522 |
| 2013/0328879 | A1 * | 12/2013 | Carbonneau | G01C 21/32 345/440 |
| 2013/0328924 | A1 * | 12/2013 | Arikan | G06T 11/00 345/629 |
| 2015/0185026 | A1 * | 7/2015 | Hightower | G01C 21/3658 701/533 |
| 2015/0242674 | A1 * | 8/2015 | Ahmed | G06V 20/176 382/113 |
| 2015/0290535 | A1 * | 10/2015 | Wroblewski | A63F 13/216 463/31 |
| 2016/0188996 | A1 * | 6/2016 | Modica | G06K 9/48 382/203 |
| 2016/0214612 | A1 * | 7/2016 | Kashiba | B60W 30/18163 |
| 2016/0247397 | A1 * | 8/2016 | Xu | G08G 1/0125 |
| 2016/0273925 | A1 * | 9/2016 | Maekawa | G01C 21/3848 |
| 2017/0200374 | A1 * | 7/2017 | Yanagihara | G08G 1/0129 |
| 2018/0188043 | A1 * | 7/2018 | Chen | G06T 7/55 |
| 2018/0188743 | A1 * | 7/2018 | Wheeler | G08G 1/096822 |
| 2018/0189578 | A1 * | 7/2018 | Yang | G01C 21/32 |
| 2018/0245936 | A1 * | 8/2018 | Sakurai | G01C 21/3461 |
| 2019/0114909 | A1 * | 4/2019 | Halama | G08G 1/0141 |
| 2019/0244517 | A1 * | 8/2019 | Moustafa | G08G 1/0112 |
| 2019/0339085 | A1 * | 11/2019 | Naef | B60W 50/0097 |
| 2020/0079346 | A1 * | 3/2020 | Payne | B60W 20/12 |
| 2020/0088538 | A1 * | 3/2020 | Sekiyama | G06T 7/20 |
| 2020/0117922 | A1 * | 4/2020 | Zhang | G01C 21/3446 |
| 2020/0132476 | A1 * | 4/2020 | Roeth | G06V 20/588 |
| 2020/0192368 | A1 * | 6/2020 | Bonanni | G01C 21/3844 |
| 2020/0231158 | A1 * | 7/2020 | Okuyama | B60W 50/082 |
| 2020/0240793 | A1 * | 7/2020 | Li | G01C 21/32 |
| 2020/0284590 | A1 * | 9/2020 | Chen | G01C 21/3804 |
| 2020/0298836 | A1 * | 9/2020 | Kim | B60W 40/105 |
| 2020/0363806 | A1 * | 11/2020 | Kobilarov | G06V 20/56 |
| 2020/0408557 | A1 * | 12/2020 | Fasola | G01C 21/3614 |
| 2021/0063200 | A1 * | 3/2021 | Kroepfl | G01C 21/1652 |
| 2021/0183238 | A1 * | 6/2021 | Guo | G08G 1/0112 |
| 2021/0192956 | A1 * | 6/2021 | Takeda | G08G 1/0125 |
| 2021/0206380 | A1 * | 7/2021 | Maheshwari | G06V 10/50 |
| 2021/0209941 | A1 * | 7/2021 | Maheshwari | G06V 10/50 |
| 2022/0075387 | A1 * | 3/2022 | Choi | B60W 30/14 |
| 2022/0090933 | A1 * | 3/2022 | Corbiere | B60W 50/14 |
| 2022/0113159 | A1 * | 4/2022 | Hou | G01C 21/3837 |

(56) References Cited

U.S. PATENT DOCUMENTS

2022/0207996 A1\* 6/2022 Xu .................. G08G 1/0133
2023/0080319 A1\* 3/2023 Zhang ............... G01C 21/3626

FOREIGN PATENT DOCUMENTS

JP  2019056739 A \* 4/2019  ............ G01C 21/32
WO  WO 2016/059481 A1  4/2016

\* cited by examiner

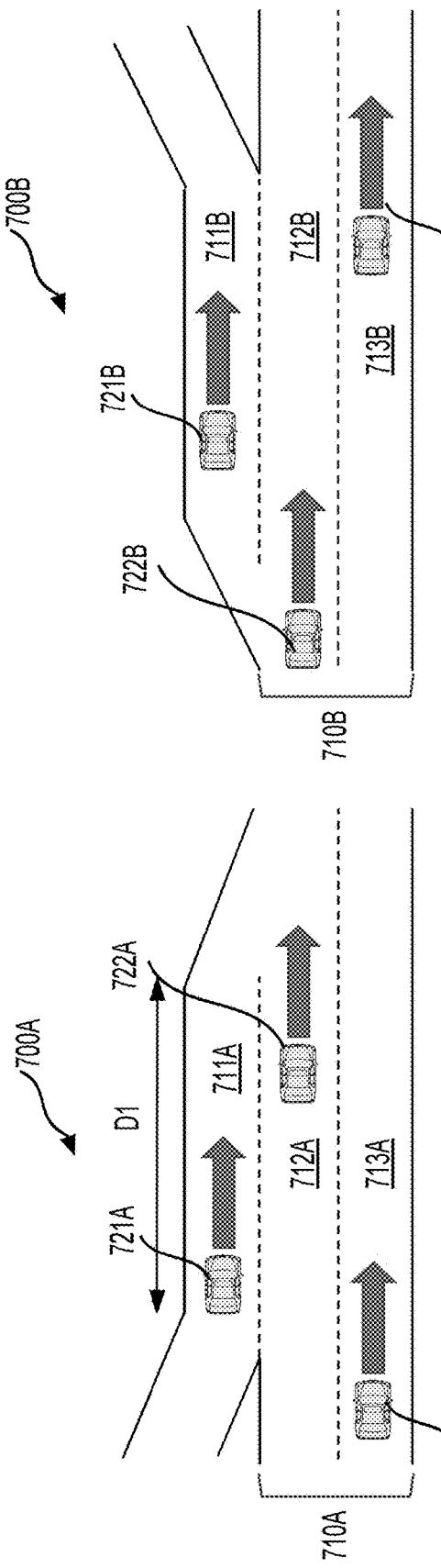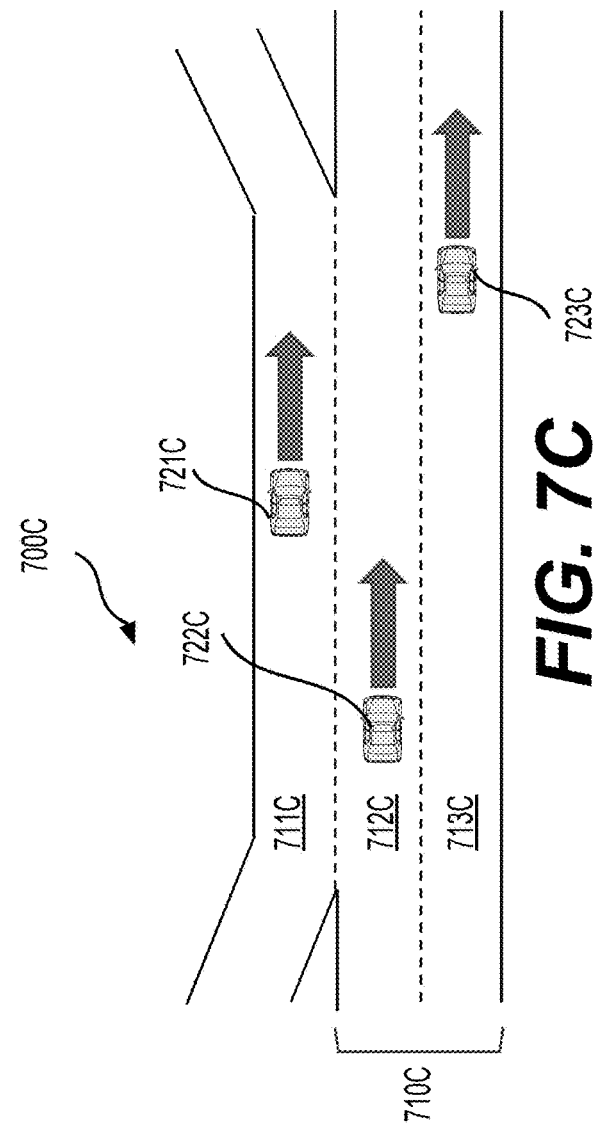

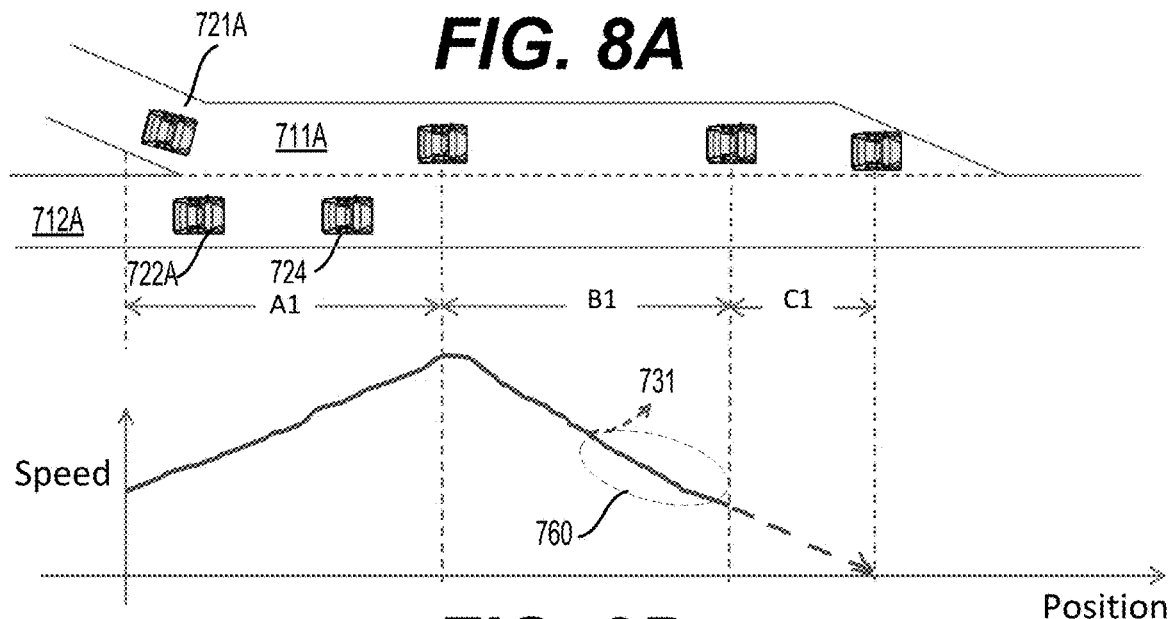
FIG. 8A
FIG. 8B
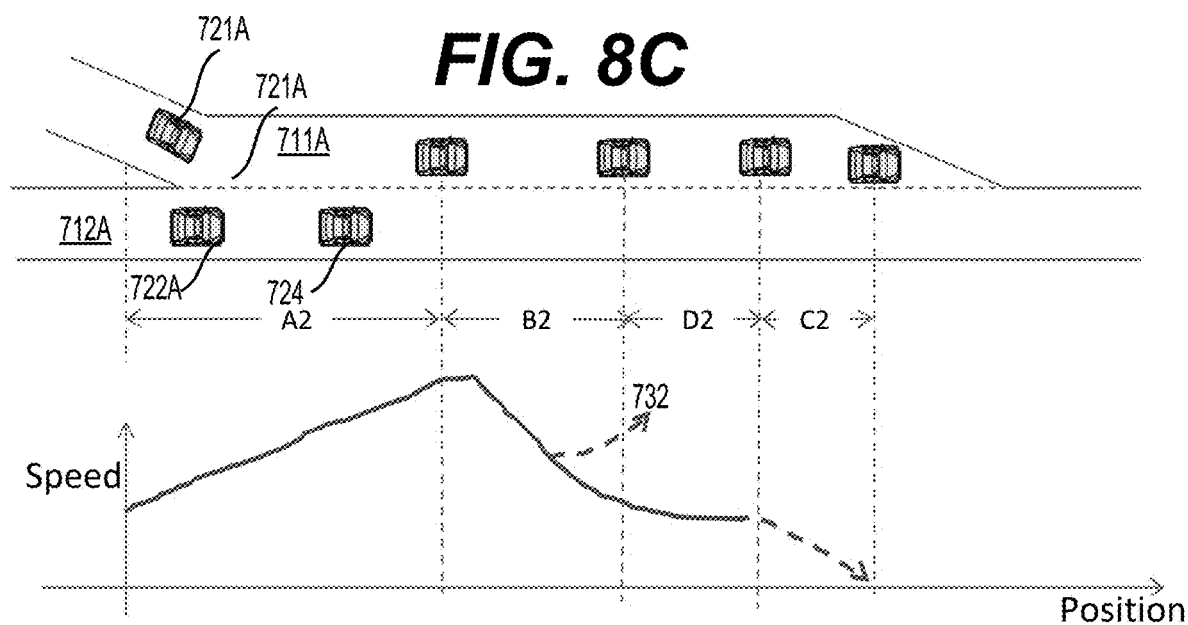
FIG. 8C
FIG. 8D

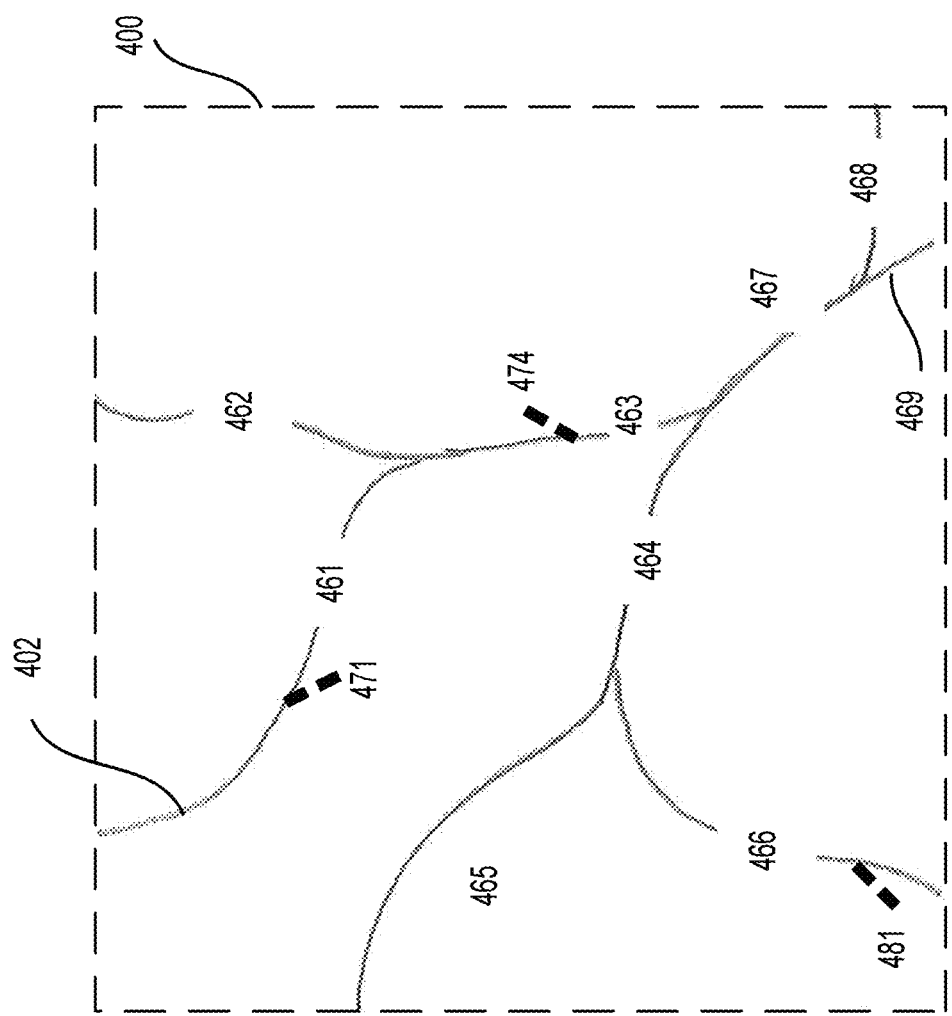

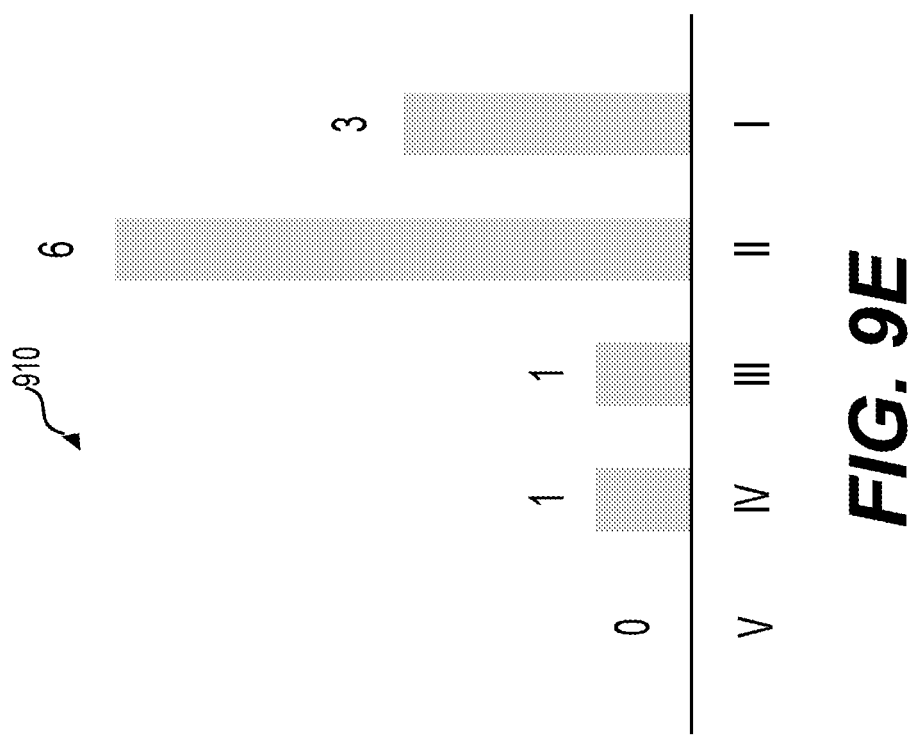

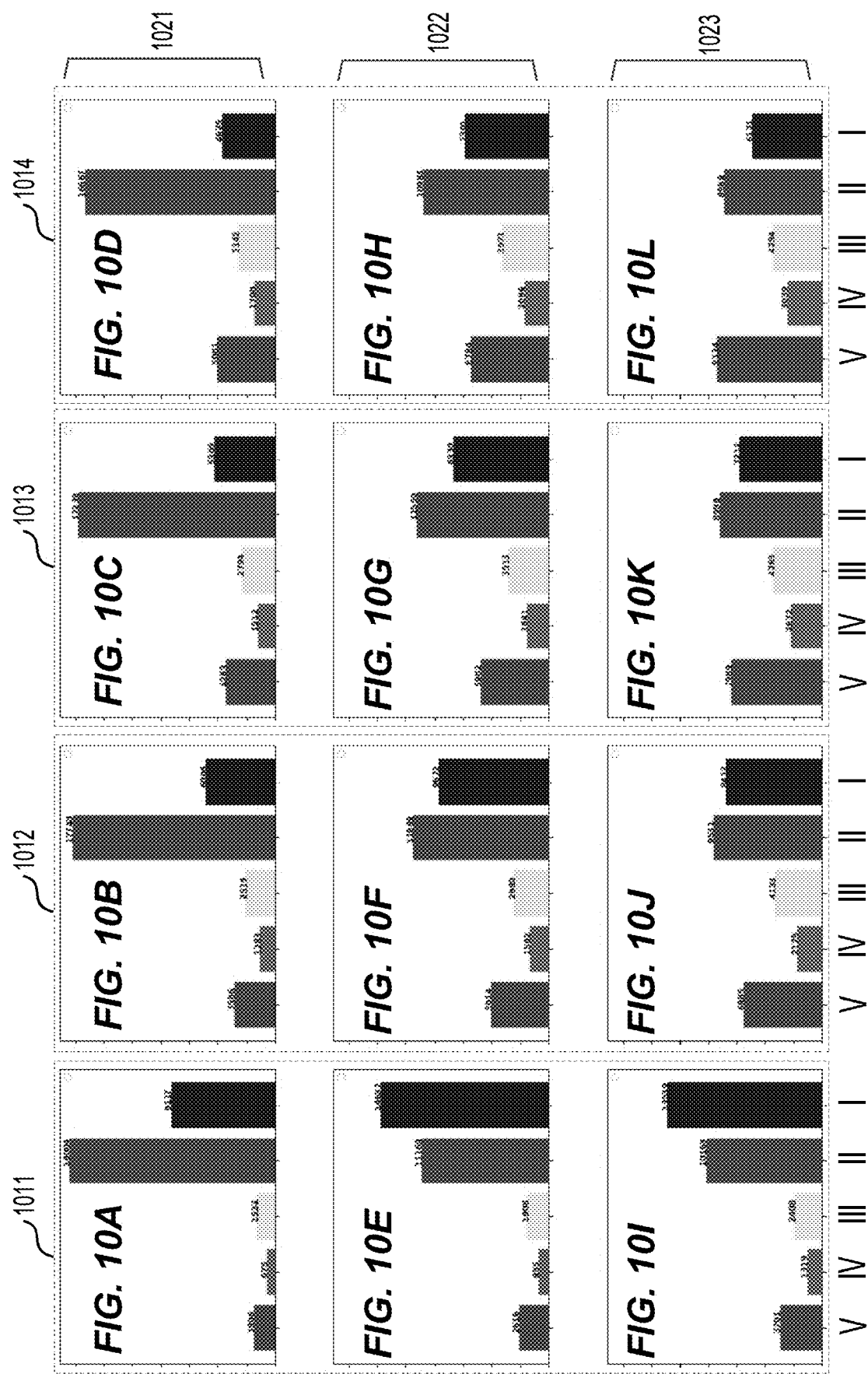

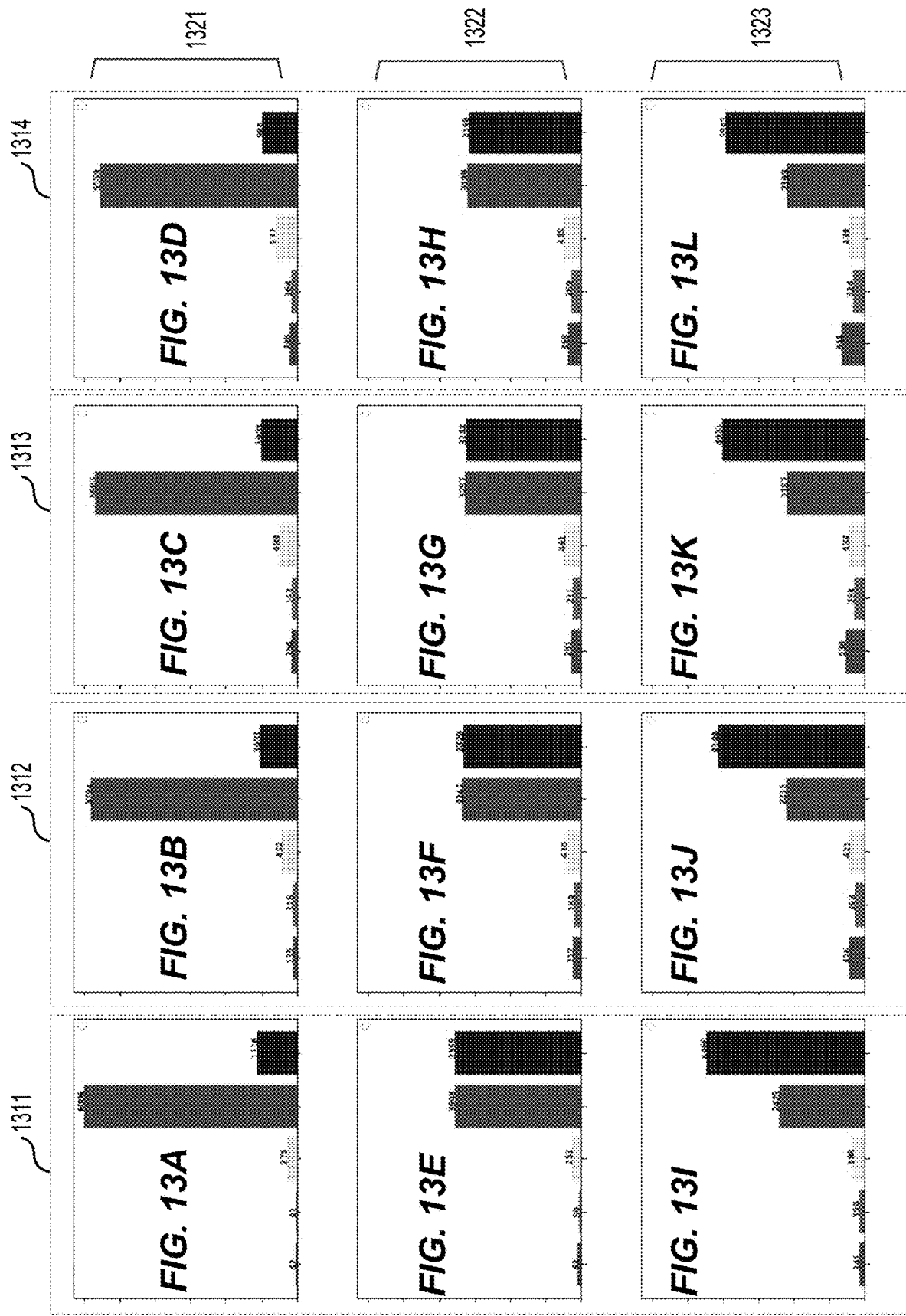

APPARATUS AND METHOD FOR FORMING AND ANALYZING CONNECTED ROADS

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. Pat. No. 9,305,380 B2 describes a method for conflating geometries to a road in a map region for an electronic mapping service. The method receives a first geometry representing a road. The method receives several geometries arranged such that a gap representing the road is between the geometries. The gap is not aligned with the first geometry representing the road. The method expands the geometries toward the first geometry such that the geometries converge at the first geometry. The road geometry is for drawing over the plurality of other geometries by a client mapping application.

SUMMARY

According to the present disclosure, there is provided an apparatus and a method for forming and analyzing connected roads. The apparatus can include processing circuitry. The processing circuitry determines, based on a first map of a region having road segments, a second map having connected roads. One of the connected roads is formed by combining a plurality of the road segments and is longer than a threshold. The processing circuitry determines road complexity of one of the connected roads in the second map for route planning and/or testing. In an example, the road segments are shorter than the threshold. The road complexity includes, but is not limited to, information of at least one of: ramps, curves, lanes, orientation, hills, tunnels, and speed limit of the one of the connected roads. The apparatus can further include interface circuitry that is configured to obtain the first map.

The processing circuitry may further be configured to determine whether the first map is to be divided. When the first map is determined to be divided, the processing circuitry can divide the first map into multiple first sub-maps. The processing circuitry can determine, based on the first sub-maps, second sub-maps by connecting the road segments into connected sub-roads and combine the sub-roads in the second sub-maps into the connected roads in the second map. In an example, the processing circuitry is configured to determine whether the first map is to be divided based on at least one of: a number of the road segments and a size of the region.

One of the connected roads may include a ramp. The processing circuitry is further configured to determine merge achievability for the ramp based on information of the ramp, the one of the connected roads, and a vehicle to merge onto the one of the connected roads. In an example, the processing circuitry is further configured to implement a merge model that includes a transition period when the vehicle is controlled by a driver of the vehicle and an automatic period when the vehicle is controlled automatically. The information can include a ramp distance, a speed limit of the one of the connected roads, a maximum speed of the vehicle, and a maximum acceleration of the vehicle.

In an example, the processing circuitry is further configured to obtain at least one route based on the road complexity.

According to the present disclosure, there is provided a non-transitory computer readable storage medium having instructions stored thereon that when executed by processing circuitry causes the processing circuitry to perform a method. The method can include determining, based on a first map of a region having road segments, a second map having connected roads where one of the connected roads is formed by combining a plurality of the road segments and is longer than a threshold. The method further includes determining road complexity of one of the connected roads in the second map for route planning and/or testing.

BRIEF DESCRIPTION OF THE DRAWINGS

Various embodiments of this disclosure that are proposed as examples will be described in detail with reference to the following figures, wherein like numerals reference like elements, and wherein:

FIGS. 7A-7C show examples of merging, diverging, and merging/diverging;

FIG. 8A shows a first merge model according to the present disclosure;

FIG. 8B shows a first speed versus position relationship according to the present disclosure;

FIG. 8C shows a second merge model according to the present disclosure;

FIG. 8D shows a second speed versus position relationship according to the present disclosure;

FIGS. 9A-9D show exemplary displays of merging achievability overlaid on the second map 402 according to the present disclosure;

FIG. 9E shows a histogram 910 of the merging achievability;

FIGS. 10A-10L shows histograms for level I-V merge achievability;

FIGS. 13A-13L shows histograms for level I-V merge/diverge achievability.

DETAILED DESCRIPTION

A first map, such as a high-definition (HD) map, of a region can have short road segments, such as road segments 5 to 100 meters long. Certain road complexity in the region, such as information of curves, hills, ramps, orientations, and the like, is determined over longer distances, such as longer than 100 meters. According to aspects of the disclosure, a plurality of short road segments in the first map can be combined or connected into a connected road in a second map, and thus the second map including connected roads can be determined based on the first map. Subsequently, the road complexity of the region can be determined based on the connected roads in the second map. Further, route planning can be performed based on the road complexity.

Figure 1:
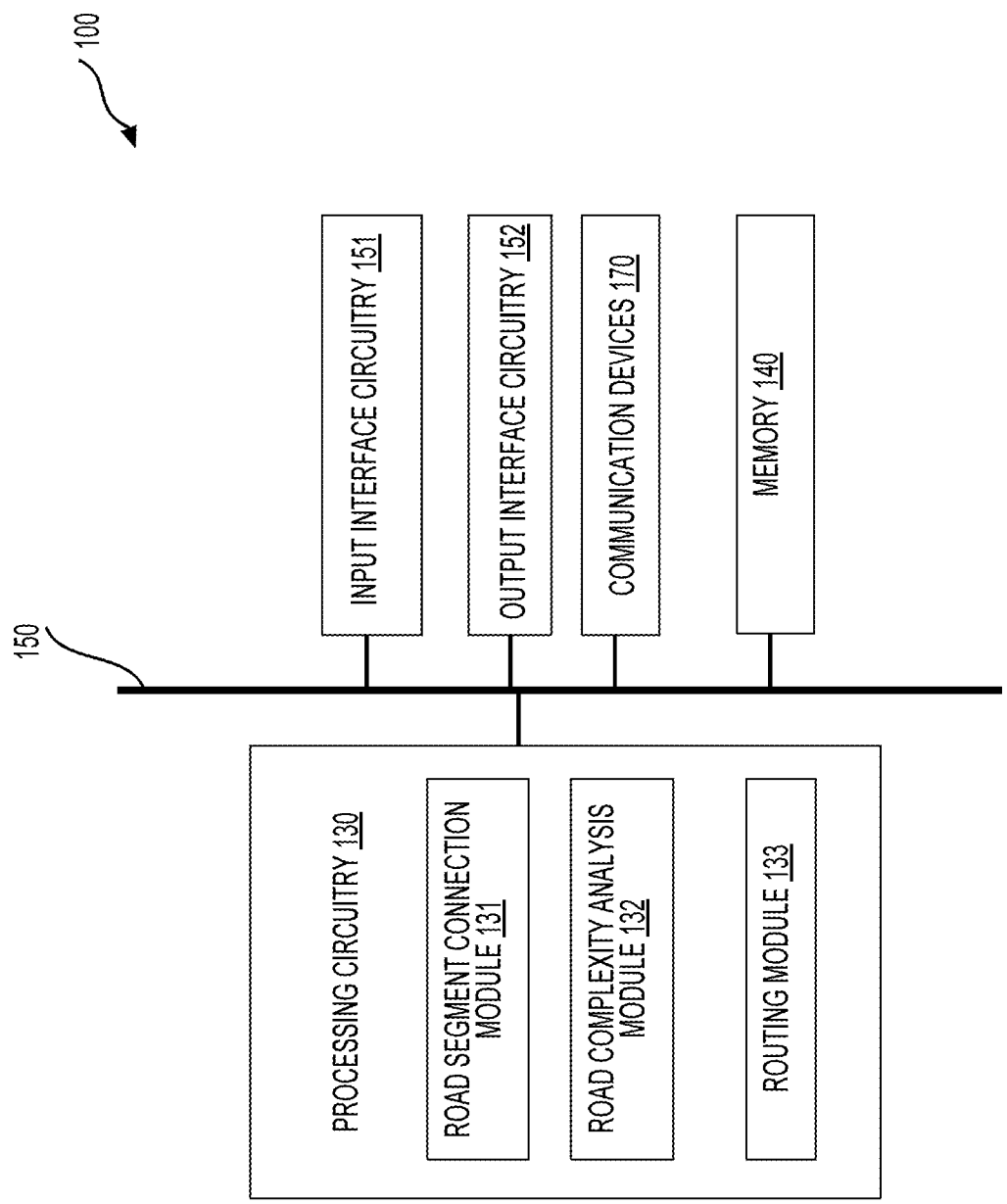
FIG. 1 is a schematic of an exemplary apparatus 100 according to the present disclosure.

FIG. 1 is a schematic of an exemplary apparatus 100 according to the present disclosure including processing circuitry 130, input interface circuitry 151, output interface circuitry 152, communication devices 170, and memory 140.

Figure 4A:
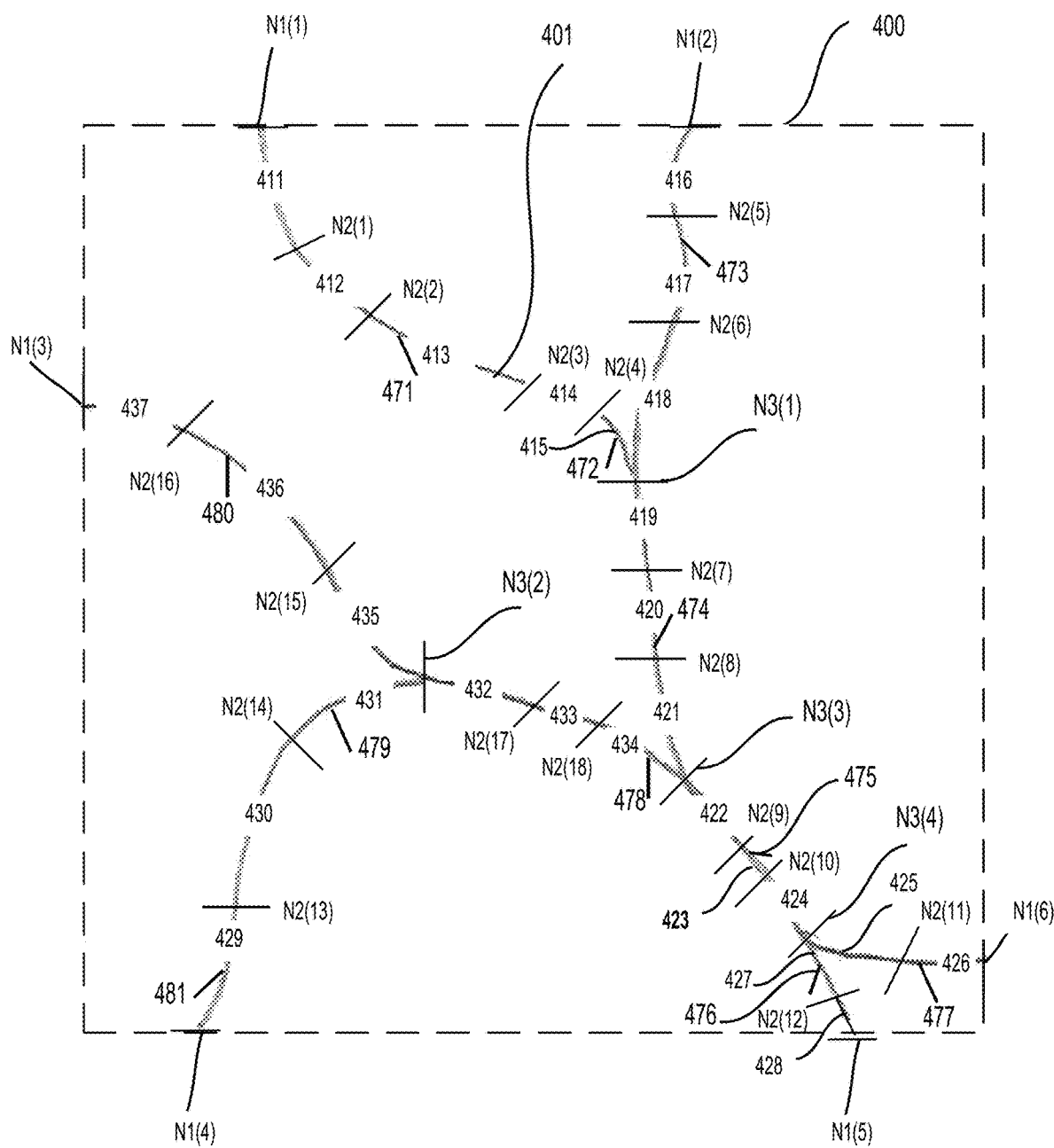
FIG. 4A shows a first map 401 for a region 400.

The input interface circuitry 151 can be configured to receive map information of a region, such as a HD map having short road segments and the like. FIG. 4A shows a first map 401 received by the input interface circuitry 151 for a region 400. The first map 401 has road segments 411-437. The first map 401 can include first nodes N1(1)-(6), second nodes N2(1)-(18), and third nodes N3(1)-(4). Each of the first nodes N1(1)-(6) is located at an edge of the first map 401 and is an end of only one road segment in the first map 401. Each of the second nodes N2(1)-(18) can separate two adjacent road segments and is an end of the two adjacent road segments. For example, the second node N2(1) separates the road segments 411-412 and is an end of the two adjacent road segments 411-412. Each of the third nodes can separate more than two adjacent road segments. For example, the third node N3(1) separates the road segments 415, 418, and 419.

The road segments 411-437 can be categorized into first segments (also referred to as dead ends) and second segments (also referred to as connected road segments). The first segments include the road segments 411, 416, 426, 428, 429, and 437 and the second segments include remaining road segments, such as the road segments 412-415, in the first map 401. Each first segment includes one of the first nodes N1(1)-(6) and one of the second nodes N2(1)-(18) or the third nodes N3(1)-(4). Each first segment is located at an edge of the first map 401 or the region 400. Each second segment includes two of the second nodes N2(1)-(18) and/or the third nodes N3(1)-(4).

The first map 401 includes ramps (also referred to as connected links) 471-481 that are associated with the road segments 413, 415, 417, 420, 423, 427, 426, 434, 431, 436, and 429, respectively. A ramp can refer to a road that is used for a vehicle to merge onto and/or diverge from another road (e.g., a highway). In an example, the first map 401 can include other roads or road segments (not shown) that are connected to the ramps 471-481.

By way of example, a subset of the road segments 411-437 is shorter than a first threshold, such as 100 meters, and the first map 401 is a HD map where the road segments 411-437 are shorter than the first threshold.

The map information can also include one or more road characteristics for one or more of the road segments 411-437. The road characteristics can include information of lanes, ramps, elevations (or altitudes), tunnels, speed limits, orientations (e.g., an angle of a road segment with respect to a west-east direction), and the like.

The input interface circuitry 151 can also be configured to receive data related to route planning, such as a starting point, a destination, criteria used to select an optimal route from a plurality of routes, and the like. For example, the input interface circuitry 151 can receive traffic information or data related to route planning/testing from any suitable external sources. The traffic information can be real-time traffic information or previously collected traffic information. In an example, the traffic information can be used to determine road complexity, such as merge achievability. The input interface circuitry 151 can include any suitable individual device or any suitable integration of multiple devices such as touch screens, keyboards, keypads, a mouse, joysticks, microphones, universal series bus (USB) interfaces, optical disk drives, wireless receivers, and the like. The input interface circuitry 151 can also include a controller that convert data into electrical signals and send the electrical signals to the processing circuitry 130.

Referring to FIG. 1, the processing circuitry 130 can include a road segment connection module (also referred to as a connection module) 131, a road complexity analysis module (also referred to as an analysis module) 132, and a routing module 133. The connection module 131 can be configured to receive and process the map information from, for example, the input interface circuitry 151. In an example, the connection module 131 receives the first map 401 shown in FIG. 4A and combines the road segments 411-437 into connected roads 461-469, as shown in FIG. 4D, for example, based on geometric relationship of the road segments. Referring to FIG. 4A, at one of the second nodes N2(1)-(18), such as N2(1), the connection module 131 can connect two adjacent road segments, such as the road segments 411-412 to form a portion of the connected road 461. At one of the third nodes N3(1)-(4), such as N3(1), the connection module 131 can determine that N3(1) is an end of the connected road 461. Accordingly, referring to FIGS. 4A and 4D, the connection module 131 can be configured to combine the road segments 411-415 into the connected road 461. Similarly, the connection module 131 can combine the road segments 416-418 into the connected road 462, combine the road segments 419-421 into the connected road 463, combine the road segments 432-434 into the connected road 464, combine the road segments 435-437 into the connected road 465, combine the road segments 429-431 into the connected road 466, combine the road segments 422-424 into the connected road 467, combine the road segments 425-426 into the connected road 468, and combine the road segments 427-428 into the connected road 469.

The region 400 can have any suitable size and shape, such as a rectangle, a square, a circle, or the like. Instead of combining a plurality of road segments directly into a connected road as described above, referring to FIG. 4B, the connection module 131 can also divide the region 400 into a plurality of sub-regions 400A-D, and thus divide the first map 401 into a plurality of first sub-maps 401A-D, respectively, for example, when a size of the region 400 exceeds a size threshold, when a number of the road segments 411-437 in the first map 401 exceeds a number threshold, and/or the like. The first sub-maps 401A-D are in the respective sub-regions 400A-D.

The connection module 131 can determine second sub-maps 402A-D based on the respective first sub-maps 401A-D by combining road segments in each of the first sub-maps 401A-D into connected sub-roads in the respective second sub-map. More specifically, referring to FIGS. 4A-4C, the connection module 131 can combine the road segments 411-413 into a connected sub-road 441 and the road segments 436-437 into a connected sub-road 442 to form the second sub-map 402A. The connection module 131 can combine the road segments 416-418 into a connected sub-road 443 and the road segments 414-415 into a connected sub-road 444 to form a portion of the second sub-map 402B. The second sub-map 402B also includes the road segment 419 not combined with other road segments in the sub-map 402B. The connection module 131 can combine the road segments 429-431 into a connected sub-road 445 to form a portion of the second sub-map 402C. The second sub-map 402C also includes the road segments 435 and 432 that are not combined with other road segments in the sub-map 402C. Further, the connection module 131 can combine the road segments 420-421 into a connected sub-road 446, the road segments 433-434 into a connected sub-road 447, the road segments 422-424 into a connected sub-road 448, the road segments 425-426 into a connected sub-road 449, and the road segments 427-428 into a connected sub-road 450 to form the second sub-map 402D. As described above, the second sub-maps 402A-D can include connected sub-roads. The second sub-maps 402A-D can also include one or more road segments, such as the road segments 419, 432, and 435, that are not connected with other road segments in the respective second sub-maps.

Figures 4B, 4C:
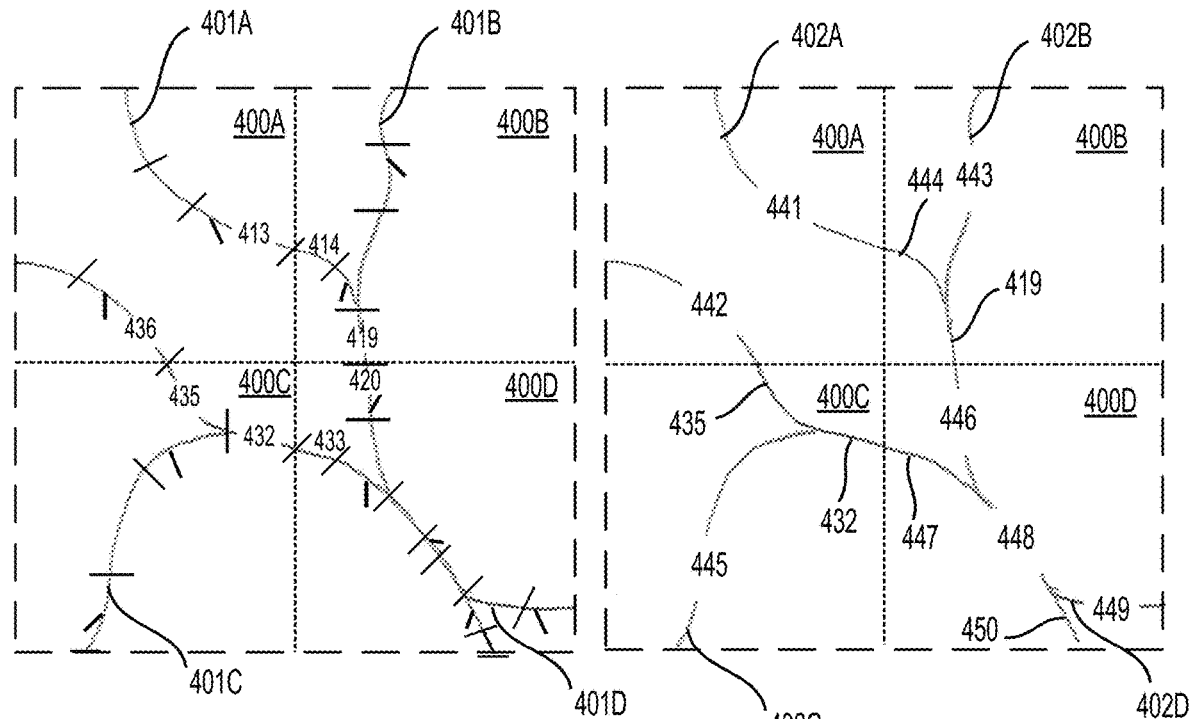
FIG. 4B shows first sub-maps 401A-D.
FIG. 4C shows second sub-maps 402A-D.
Figure 4D:
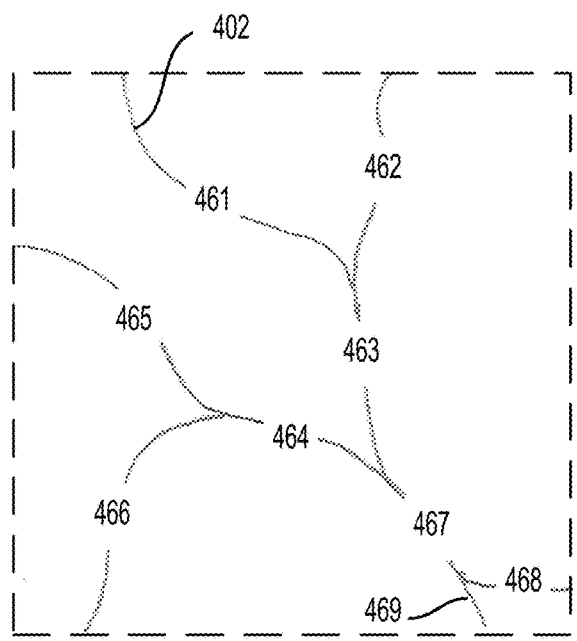
FIG. 4D shows a second map 402 including connected roads determined based on the first map according to the present disclosure.

Referring to FIGS. 4C-4D, the connection module 131 can determine the connected roads 461-469 in the second map 402 based on the sub-roads 441-450 and the road segments 419, 432, and 435 in the respective second sub-maps 402A-D. For example, the connection module 131 combines the sub-roads 441 and 444 into the connected road 461; combines the sub-road 446 and the road segment 419 into the connected road 463; combines the sub-road 447 and the road segment 432 into the connected road 464; combines the sub-road 442 and the road segment 435 into the connected road 465. The connected road 462 is the sub-road 443, the connected road 466 is the sub-road 445, the connected road 467 is the sub-road 448, the connected road 468 is the sub-road 449, and the connected road 469 is the sub-road 450. Accordingly, the second map 402 includes the connected roads 461-469.

The methods described above can be suitably adapted to scenarios where a road segment is located in more than one first sub-maps.

The analysis module 132 can determine road complexity of a map in a region, for example, for route planning, route testing, and/or the like. The road complexity can be used in field operation test planning, vehicle evaluation, automated driving software development, and the like. The road complexity can include information of curves, hills, ramps, road orientation, lanes, speed limits, and the like. The road complexity can be determined based on roads, such as connected roads, having lengths longer than the first threshold.

Figure 5A:
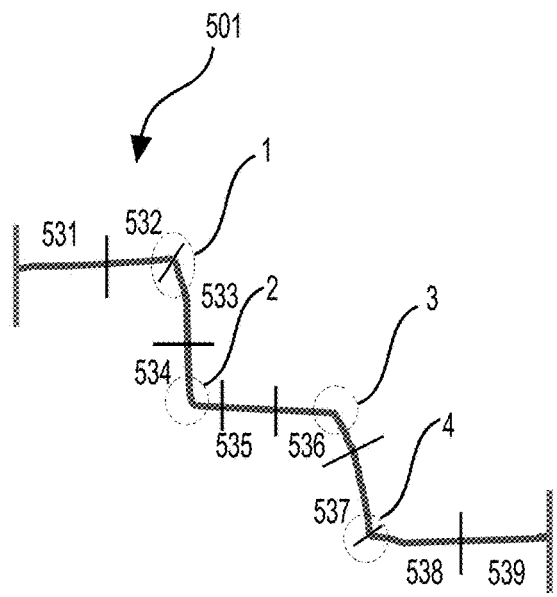
FIG. 5A-C show examples of road complexity analysis according to the present disclosure.
Figure 5B:
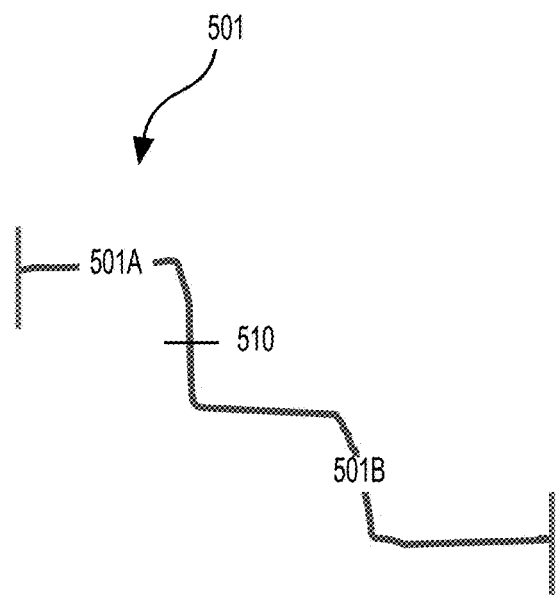
Figure 5C:
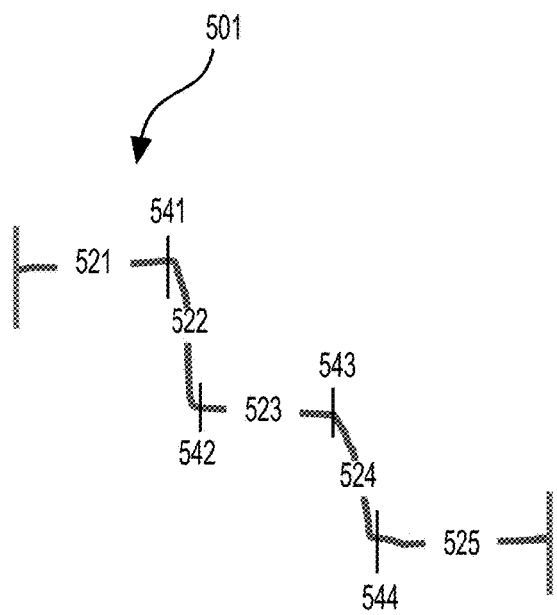

FIGS. 5A-5C show examples of road complexity analysis according to the disclosure. In FIG. 5A, curve information, e.g., a number of curves per unit length, of a road 501 can be determined. In an example, the road 501 is obtained by combining a plurality of shorter road segments 531-539 using the connection module 131. The curve information may not be determined accurately based on individual road segments 531-539, however, can be determined accurately based on the connected road 501. Referring to FIG. 5A, the road 501 is 10 kilometers (km) long and there are curves 1-4 in the road 501, and thus the curve information is 0.4 curves per km.

In FIG. 5B, lane information of the road 501 can be determined. For example, the lane information can be represented by an average number of lanes. Referring to FIG. 5B, the road 501 includes two portions 501A-B separated by a divider 510. The portion 501A has 4 lanes and the portion 501B has 3 lanes. Any suitable method can be used to calculate the average number of lanes for the road 501. In FIG. 5B, the average number of lanes is calculated based on the numbers of lanes and respective lengths of the portions 501A-B, and thus the average number of lanes is 3.2 lanes.

In FIG. 5C, road orientation of the road 501 can be determined. The road orientation can describe how much a road or portions of the road is/are oriented along a certain direction, such as a west to east direction, a south to north direction, or the like. For example, the road orientation of a "60% low Sun-angle" indicates that 60% of the road 501 is aligned to the west to east direction. To obtain the road orientation, the analysis module 132 can divide the road 501 into portions 521-525 by dividers 541-544, respectively. One of the portions 521-525 can be determined to be associated with a low-Sun angle when an angle between the portion and the west to east direction is less than an angular threshold. For example, the portion is determined to be associated with the low-Sun angle when the portion is substantially parallel to the west to east direction. Otherwise, when the angle between the portion and the west to east direction is equal to or larger than the angular threshold, the portion is determined not to be associated with the low-Sun angle. Referring to FIG. 5C, the portions 521, 523, and 525 are determined to be associated with the low-Sun angle and the portions 522 and 524 are determined not to be associated with the low-Sun angle. Accordingly, the road orientation of the road 501 is "60% low Sun-angle". Of course, other suitable criteria and/or methods can be used to describe or calculate the road orientation.

Figure 5D:
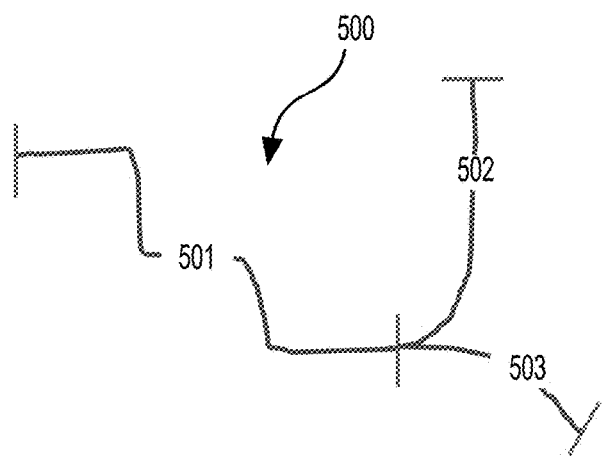
FIG. 5D shows results of a road complexity analysis according to the present disclosure.

FIG. 5D shows results of a road complexity analysis according to the disclosure. A map 500 includes roads 501-503. In an example, the roads 501-503 are connected roads obtained from a plurality of shorter road segments, respectively. The analysis module 132 can analyze the roads 501-503, respectively, using, for example, the methods described above and obtain the road complexity analysis results described in Table 1.

TABLE 1

| | Road complexity analysis results | | |
|---|---|---|---|
| Road | Curve information (curves per km) | Lane information (number of Lanes) | Orientation [% of low-Sun angle] |
| 501 | 0.4 | 3.2 | 60 |
| 502 | 0.2 | 4 | 0 |
| 503 | 0.2 | 4 | 80 |

As seen from Table 1, the road 501 has more curves per km than the roads 502-503. The roads 502-503 differ in the respective orientations: the road 502 mainly runs from the south to the north while the road 503 mainly runs from the west to the east.

The routing module 133 can be configured to implement route planning based on the road complexity, for example, obtained by the analysis module 132 and certain criteria. The criteria can be associated with, curve information, lane information, orientation, ramp information, and the like. In various examples, the criteria is a 'hardest route', an 'easiest route', a 'curviest route', a route having low-Sun angle, a route having most ramps, or the like. The routing module 133 can obtain a plurality of routes based on a starting point and a destination by using suitable method or algorithms, such as "k shortest path routing" algorithms based on Dijkstra's algorithm, Bellman Ford algorithm, and the like.

Further, the routing module 133 can select at least one of the plurality of routes based on the criteria. For example, the at least one of the plurality of routes can be the 'hardest route' that includes, for example, one or more of at least a first number of curves per km, at least a second number of lanes, at least a third percentage of low-Sun angle, and at least a fourth number of ramps that are difficult to merge. The at least one of the plurality of routes can also be the 'easiest route' for implementing a comfort test, the curviest route for a lane center test, the low-Sun angle road for a camera test, the most ramps road for a dynamic handling test, or the like.

The output interface circuitry 152 can be configured to output data, such as a map having connected roads, road complexity analysis results, one or more routes that are planned based on the road complexity analysis result, and the like. The output interface circuitry 152 can include any suitable individual device or any suitable integration of multiple devices such as display devices, audio devices, such as speakers, wireless transmitters, and the like. The output interface circuitry 152 can also include a controller that convert electrical signals from the processing circuitry 130 to the data, such as visual signals including text messages used by a display device, audio signals used by a speaker, and the like. In an example, a component of the input interface circuitry 151 and a component of the output interface circuitry 152 can be combined into a device. For example, the output interface circuitry 152 can be configured to output an image on an interactive screen and the input interface circuitry 151 can be configured to receive data generated by a stylus interacting with the interactive screen.

The communication devices 170 can be configured to communicate with any suitable device using any suitable communication technologies, such as wired, wireless, fiber optic communication technologies, and any suitable combination thereof. The communication devices 170 can include any suitable communication devices using any suitable communication technologies. In an example, the communication devices 170 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like. The communication devices 170 can receive traffic information related to route planning from suitable external sources. The traffic information can be real-time traffic information or previously collected traffic information. In an example, the traffic information can be used to determine road complexity, such as merge achievability.

The input interface circuitry 151 and/or the output interface circuitry 152 can include the communication devices 170. The communication devices 170 can also be configured to receive the map information and/or output data, such as a map having connected roads, road complexity analysis results, one or more routes that are planned based on the road complexity analysis result, and the like.

The memory 140 is configured to store maps, such as a map having short road segments, a HD map, a map having connected roads, and the like. The memory 140 can also store road complexity analysis results, criteria for route planning, routes, and programs. The programs can include methods implemented by the processing circuitry 130 as described above. Information in the memory 140 can be modified or updated by the processing circuitry 130, such as the connection module 131, the analysis module 132, and the routing module 133. The memory 140 can be a non-volatile storage medium. The memory 140 can include both non-volatile and volatile storage media. A portion of the memory 140 can be integrated into the processing circuitry 130. The memory 140 can be located remotely and communicate with the processing circuitry 130 via a wireless communication standard using the communication devices 170.

In the FIG. 1 example, the components are coupled together by a bus architecture including a bus 150. Other suitable interconnection techniques can also be used.

One or more components of the input interface circuitry 151, the output interface circuitry 152, the communication devices 170, the processing circuitry 130, and the memory 140 can be made by discrete devices or integrated devices. The circuits for one or more of the input interface circuitry 151, the output interface circuitry 152, the communication devices 170, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

Figure 2:
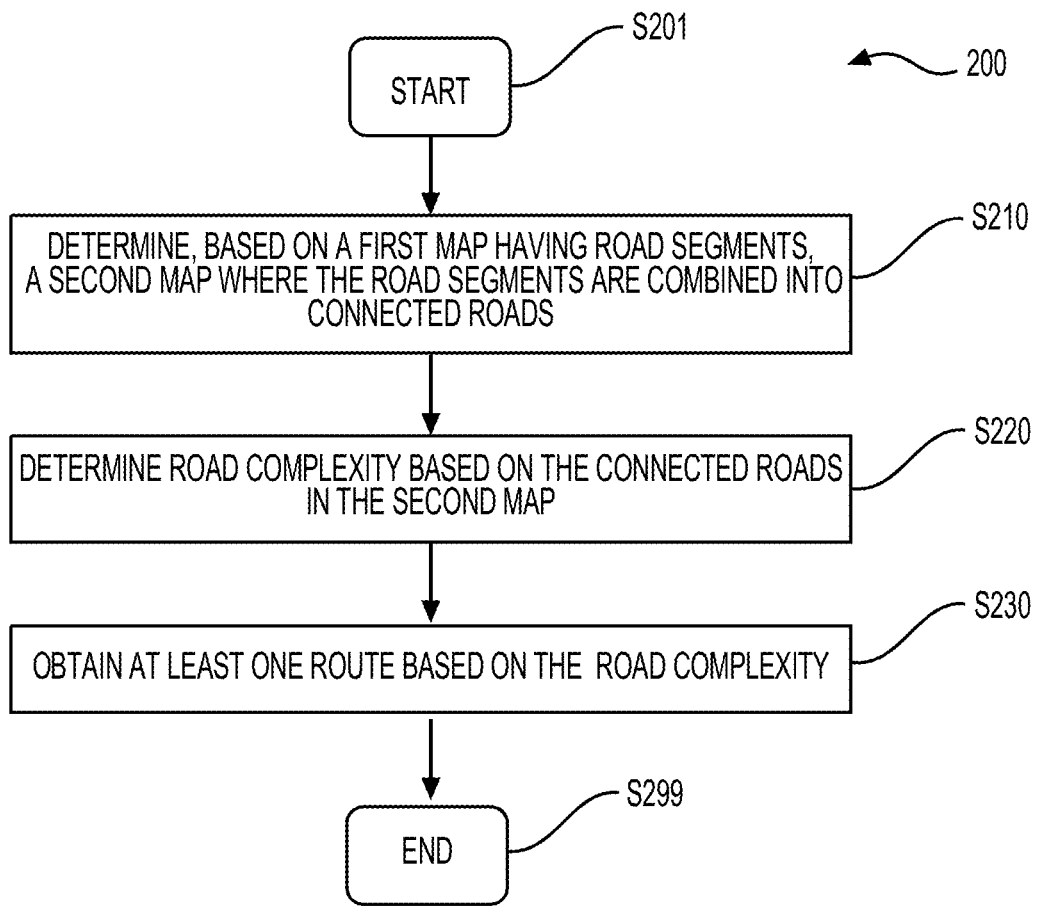
FIG. 2 is a flowchart outlining an exemplary process 200 according to the present disclosure.

FIG. 2 is a flowchart outlining an exemplary process 200 implemented using the apparatus 100 shown in FIG. 1. The process 200 can be used to combine short road segments in a first map into connected roads in a second map, determine road complexity of a region based on the connected roads in the second map, and perform route planning based on the road complexity. The first map 401 shown in FIG. 4A is used to illustrate the process 200. The process 200 starts at S201 and proceeds to S210.

At S210, the second map is determined based on the first map by combining the road segments in the first map into the connected roads in the second map. As described above, the road segments 411-437 in FIG. 4A can be directly combined into the connected roads 461-469 in FIG. 4D. For example, the road segments 411-415 can be combined into the connected road 461.

Alternatively, the first map 401 can be divided into the first sub-maps 401A-D (FIG. 4B) and the road segments in each of the first sub-maps 401A-D are combined into the connected sub-roads in the second sub-maps 402A-D (FIG. 4C). Subsequently, the sub-roads in the second sub-maps 402A-D are connected to form the connected roads 461-469 (FIG. 4D). For example, the road segments 411-413 in the first sub-map 401A are combined to form the sub-road 441 and the road segments 414-415 in the first sub-map 401B are combined to form the sub-road 444. Further, the sub-roads 441 and 444 are combined into the connected road 461. The second sub-maps 402A-D can be determined in a parallel process from the respective first sub-maps 401A-D, thus can be determined faster than determining the second map 402 directly from the first map 401.

At S220, road complexity can be determined based on the connected roads in the second map, for example, for route planning. The road complexity can be used in field operation test planning, vehicle evaluation, automated driving software development, and the like. As described above, the analysis module 132 can implement the step S220. The road complexity can include information related to curves, lanes, orientation, ramps, hills, tunnels, speed limits, and the like. Any suitable methods can be used to represent the road complexity of the connected roads in the second map. Table 2 shows an exemplary summary of the road complexity of the connected roads 461-469.

TABLE 2

Road complexity analysis results

| Road | Number of ramps | Number of lanes | Number of curves | Hills | Tunnels | Speed limit (mph) | Length (km) |
|------|-----------------|-----------------|------------------|-------|---------|-------------------|-------------|
| 461  | 2               | 3.2             | 2                | 0     | 0       | 65                | 10          |
| 462  | 1               | 4               | 3                | 0     | 0       | 77                | 7           |
| 463  | 1               | 3               | 1                | 0     | 1       | 54                | 7.5         |
| 464  | 1               | 3.5             | 1                | 1     | 0       | 76                | 6           |
| 465  | 1               | 5               | 1                | 0     | 0       | 50                | 9           |
| 466  | 2               | 3.5             | 1                | 0     | 0       | 77                | 10          |
| 467  | 1               | 5               | 0                | 0     | 1       | 65                | 5           |
| 468  | 1               | 4               | 1                | 0     | 0       | 60                | 5           |
| 469  | 1               | 4               | 0                | 0     | 0       | 65                | 2           |

Table 3 shows an example of classification analysis. Road information can be derived based on the road complexity analysis. A road can be classified into a road having 'many ramps' when a number of ramps per km in the road is larger than, for example, 2. A road can be classified into a road having 'many lanes' when an average number of lanes in the road is larger than, for example, 4. A road can be classified into a road having 'many curves' when a number of curves per km in the road is larger than, for example, 5. A road can be classified into a road having 'many hills/valleys' when an altitude inflection in the road is larger than, for example, 0.015 per km. A road can be classified into a road having 'tunnels' when a number of tunnels in the road is larger than, for example, 0. A road can be classified into a road having 'low speed' when an average speed limit of the road is less than, for example, 55 mph. A road can be classified into a road having 'high speed' when an average speed limit of the road is larger than, for example, 75 mph. In an example, other road information, such as whether a merge is easy or difficult, can also be determined. Accordingly, based on the above classification and Table 2, none of the connected roads 461-469 has 'many ramps' or has many curves; the connected road 465 has 'many lanes'; the connected road 464 has 'many hills/valleys'; the connected roads 463 and 467 have 'tunnels'; the connected roads 463 and 465 have 'low speed'; and the connected roads 462, 464, and 466 have 'high speed'. The total length of the connected roads 461-469 is 61.5 km. Of course, a road can be classified to have 'many ramps', 'many lanes', or the like using other criteria.

TABLE 3

Road complexity analysis results

| Classification | Meaning | Length (km) |
|----------------|---------|-------------|
| Many ramps | A number of ramps per km > 2 | 0 |
| Many lanes | An average number of lanes > 4 | 9 |
| Many curves | A number of curves per km > 5 | 0 |
| Many hills/valleys | An altitude inflection per km > 0.015 | 6 |
| Tunnel | A number of tunnels > 0 | 12.5 |
| Low speed | An average speed < 55 MPH | 16.5 |
| High speed | An average speed > 75 MPH | 23 |
| Total length | | 61.5 |

Figure 6A:
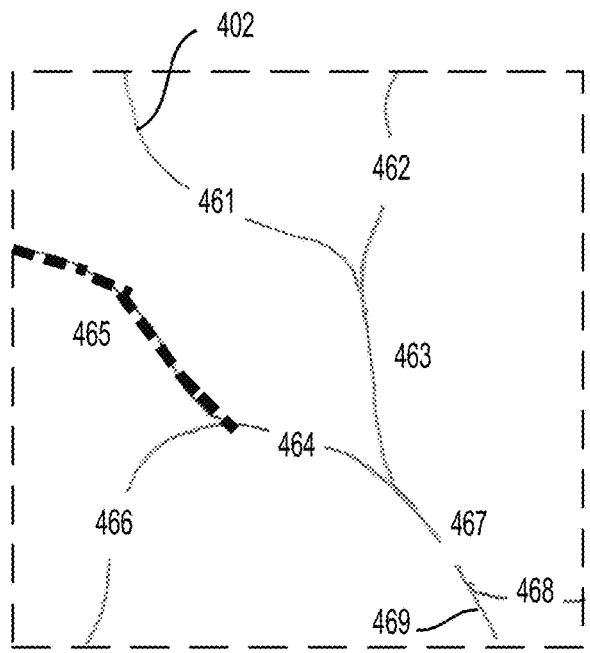
FIGS. 6A-6E show examples of road complexity analysis results according to the present disclosure.
Figure 6B:
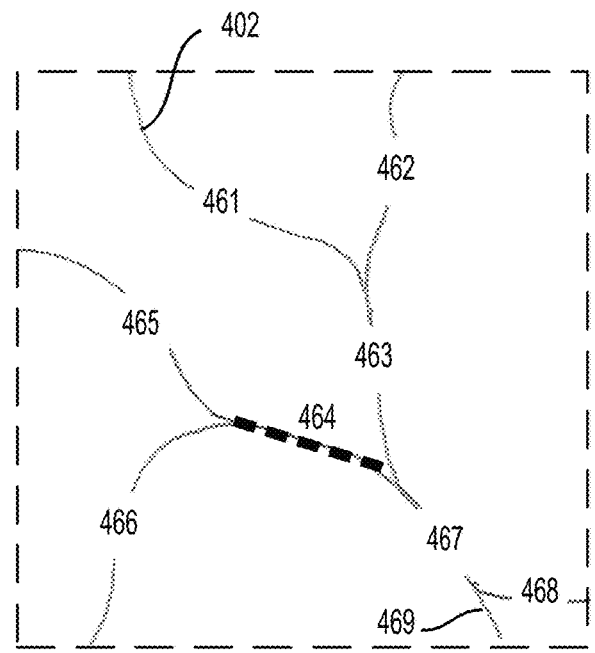
Figure 6C:
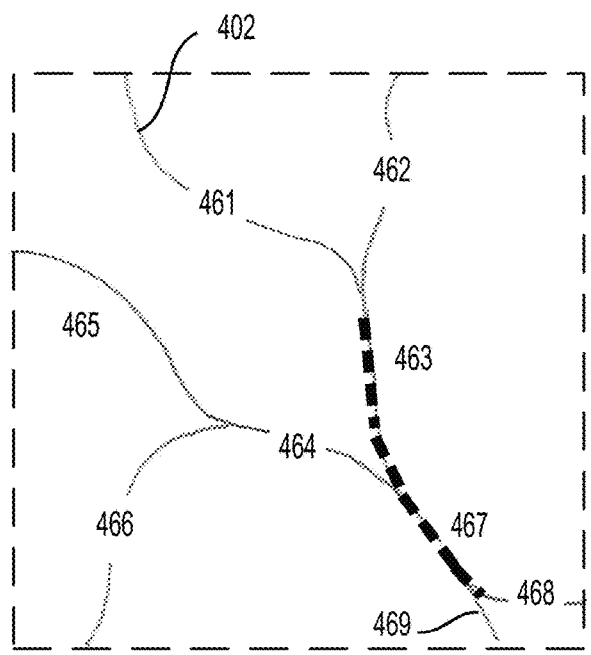
Figure 6D:
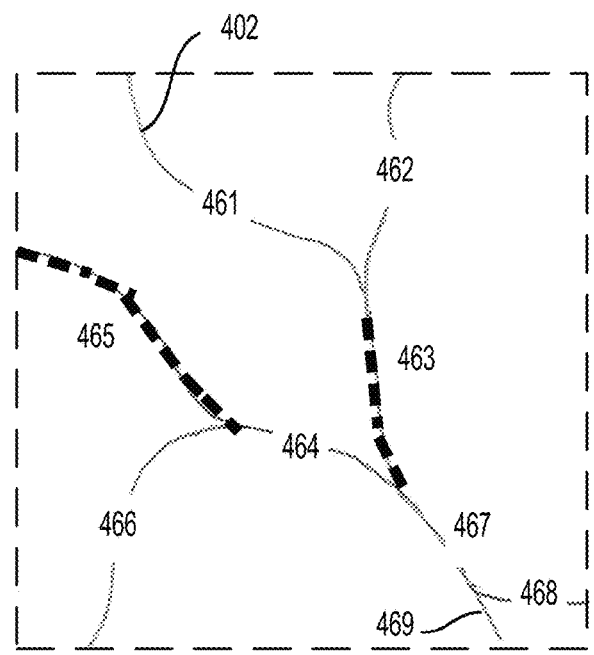
Figure 6E:
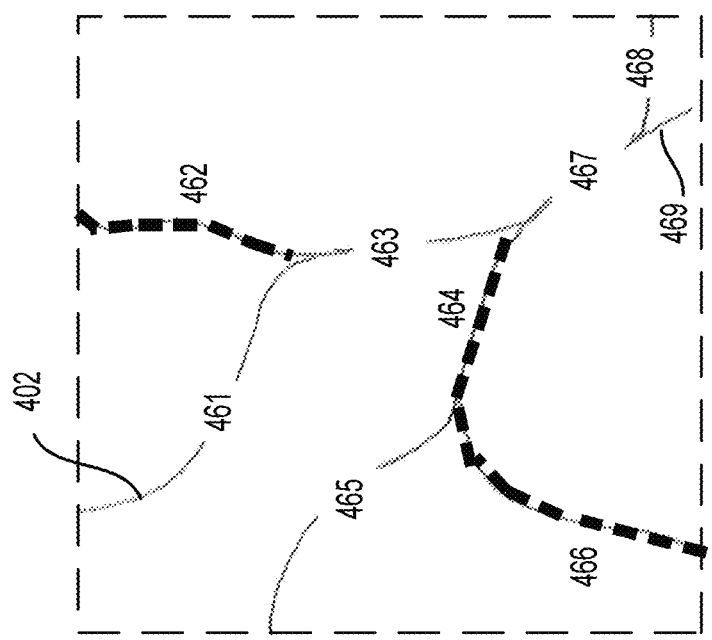

Additionally or alternatively, the road complexity analysis results can be displayed graphically. FIGS. 6A-6E show examples of highlighting the road complexity analysis results. The second map 402 including the connected roads 461-469 is shown in each of the FIGS. 6A-6E. Referring to FIG. 6A, roads having 'many lanes' are highlighted, and thus the connected road 465 (dashed line) is overlaid on the second map 402. Referring to FIG. 6B, roads having 'many hills/valleys' are highlighted, and thus the connected road 464 (dashed line) is overlaid on the second map 402. Referring to FIG. 6C, roads having 'tunnels' are highlighted, and thus the connected roads 463 and 467 (dashed line) are overlaid on the second map 402. Referring to FIG. 6D, roads having 'low speeds' are highlighted, and thus the connected roads 463 and 465 (dashed line) are overlaid on the second map 402. Referring to FIG. 6E, roads having 'high speeds' are highlighted, and thus the connected roads 462, 464, and 466 (dashed line) are overlaid on the second map 402. Various display methods can be used to visualize the road complexity analysis results. Different colors can be used to highlight different road information, and thus, for example, roads having 'many lanes' and roads having 'many hills/valleys' can be overlaid on the second map 402 in a same figure.

In addition to the information related to curves, lanes, orientation, hills, tunnels, speed limits, and the like, merging information associated with a ramp can also be determined. A ramp can refer to a road that is used for a vehicle to merge onto another road (e.g., a highway), to diverge from another road, to merge onto and then diverge from another road, and the like. A ramp can also include a plurality of short ramp segments. Therefore, the plurality of ramp segments can be connected into the ramp by, for example, the connection module 131 using similar or identical methods as described above. In various examples, ramp information and vehicle information are used to determine merging achievability, e.g., how easy or difficult a vehicle can merge onto a road via the ramp, and merging/diverging achievability, e.g., how easy or difficult a vehicle can merge/diverge onto/from a road via the ramp.

FIGS. 7A-7C show examples of merging, diverging, and merging/diverging according to the disclosure. FIG. 7A shows a merging example 700A. A road 710A has lanes 712A-713A. In an example, the road 710A is a highway. Vehicles 722A-723A run on the lanes 712A-713A, respectively. A ramp 711A is located next to the lane 712A and has a ramp distance D1. A vehicle 721A on the ramp 711A is to merge onto the road 710A. Merging achievability, i.e., how easy or difficult for the vehicle 721A to merge onto the road 710A via the ramp 711A, can be determined based on vehicle information of the vehicle 721A, the ramp information of the ramp 711A, and the road information of the road 710A. The vehicle information can include acceleration information (e.g., a maximum acceleration, a minimum acceleration), speed information (e.g., a maximum speed), and the like. The ramp information can include the ramp distance D1, curve information, speed information, hill/valley information, and the like. The road information can include speed information and the like. The merging achievability can also depend on a method (also referred to as a merge logic or a merge model) used to determine the merge achievability. In an example, the merge achievability depends on a merging speed, e.g., a speed of the vehicle when the vehicle merges onto the road 710A.

FIG. 8A shows a first merge model used to determine merge achievability. The first model includes three merging steps (also referred to as steps) A1-C1. In the step A1, the vehicle 721A attempts automatic merging from the ramp 711A to the lane 712A. The vehicle 721A can search a target space to merge, adjust a speed of the vehicle 721A, and steer the vehicle 721A into the lane 712A when there is enough space in the lane 712A for the vehicle 721A. Of course, the speed of the vehicle 721A is within a maximum speed of the vehicle 721A. In an example, the speed increases during the step A1 as shown in a corresponding first speed versus position relationship in FIG. 8B. When a distance between the vehicle 721A and an end of the ramp 711A reaches a first distance, such as 100 m, the vehicle 721A can transition into the step B1. In the step B1, the vehicle 721A starts a speed management while attempting the automatic merging. The vehicle 721A can also search a target space to merge and steer the vehicle into the lane 712A when there is enough space in the lane 712A for the vehicle 721A. In an example, the speed continues to decrease. In an example, the speed decreases in a first portion of the step B1 and then increases in a second portion when there is enough space in the lane 712A (indicated by an arrow 731). When the distance between the vehicle 721A and the end of the ramp 711A reaches a second distance, such as 40 m, the vehicle 721A can transition into the step C1. In the step C1, the vehicle 721A stops automatically before reaching an end of the ramp 711A without steering to the lane 712A. In an example, the vehicle 721A decelerates at an acceleration of 0.35 G. The stopping process in the step C1 can be too sudden and does not give a driver of the vehicle 721A enough time to recover. In order to have a smoother transition and give the driver an opportunity to recover, a second merge model in FIGS. 8C-D can be used.

FIG. 8C shows an example of the second merge model. FIG. 8D shows a second speed versus position relationship where a speed of the vehicle 721A versus a position of the vehicle 721A during the merge process in FIG. 8C is shown. The second merge model can include 4 steps: A2-D2. The step A2 is similar to the step A1, and thus detailed descriptions are omitted for purposes of brevity. In an example, when a distance between the vehicle 721A and the end of the ramp 711A reaches a third distance, the vehicle 721A can transition into the step B2. The third distance can be different from the first distance. In an example, when a distance between the vehicle 721A and the end of the ramp 711A reaches a fourth distance, the vehicle 721A can transition from B2 into the step D2. The fourth distance can be different from the second distance. At the end of step B2, a transition demand (TD) is requested where a control of the vehicle 721A is handed over to the driver. In an example, the speed decreases in a first portion of the step B2 and then increases in a second portion when there is enough space in the lane 712A (indicated by an arrow 732). In the step D2, the vehicle 721A is controlled by the driver. A duration of the step D2, i.e., a TD duration, can be set in the TD request, pre-determined, or the like. In an example, a deceleration of the vehicle 721A in the step D2 is less than that in the step C1 in FIG. 8A. At the end of the step D2, the vehicle 721A can enter the step C2, which can be identical or similar to the step C1 in FIG. 8A, and thus detailed descriptions are omitted for purposes of brevity. The vehicle 721A can stop before reaching the end of the ramp 711A in the step C2. In an example, the additional step D2 has a deceleration less than that of the step C1 and results in a relatively smooth transition.

Referring to FIGS. 8B and 8D, the first speed versus position relationship in FIG. 8B can be different from the second speed versus position relationship in FIG. 8D. For example, the speed can decrease more rapidly in a portion 760 of the step B1 in the first speed versus position relationship than that in the step D2 of the second speed versus position relationship.

The first and the second merge models can be used to determine the merge achievability. The merge achievability can be categorized into, for example, multiple levels I-V. The vehicle 721A can merge onto the lane 712A via the ramp 711A in the levels I, II, III, IV, and V when an inter vehicle time T on the road 710A or the lane 712A is less than 1 s, between 1 and 1.5 s, between 1.5 and 2 s, between 2 and 2.5 s, and larger than 2.5 s, respectively. The inter vehicle time can refer to an average time lapse of two adjacent vehicles on the lane 712A passing through a same target on the lane 712A. The levels I-V can also be referred to as 'ultra achievability', 'high achievability', 'medium achievability', 'low achievability', and 'not achievable', respectively. Therefore, the ultra achievability means that the vehicle 721A can merge onto the lane 712A when the inter vehicle time for the lane 712A is less than 1 s. An inter vehicle distance D can be determined by using D=T×V where T is the inter vehicle time and V can be determined based on a speed limit of the road 710A. V can be the speed limit or a fraction, such as 80% of the speed limit. Data and parameters used in the first and second merge models to determine the merge achievability can be obtained from traffic information that is received from an external source, for example, by the input interface circuitry 151 and/or the communication devices 170. The traffic information can be real-time traffic information or previously collected traffic information. In an example, the ramp 711A is referred to as an easy ramp and the merge is referred to as an easy merge when the merge for the vehicle 721A onto the lane 712A via the ramp 711A is in one of the levels I-III. The ramp 711A is referred to as a difficult ramp and the merge is referred to as a difficult merge when the merge for the vehicle 721A onto the lane 712A via the ramp 711A is in one of the levels IV-V. Other suitable methods or models can also be used to determine the merge achievability.

Table 4 shows the merge achievability for the ramps 471-481.

TABLE 4

| Merge achievability | |
|---|---|
| Ramp | Merge achievability |
| 471 | I |
| 472 | II |
| 473 | II |
| 474 | I |
| 475 | IV |
| 476 | II |
| 477 | III |
| 478 | II |
| 479 | II |
| 480 | II |
| 481 | I |

Figure 9B:
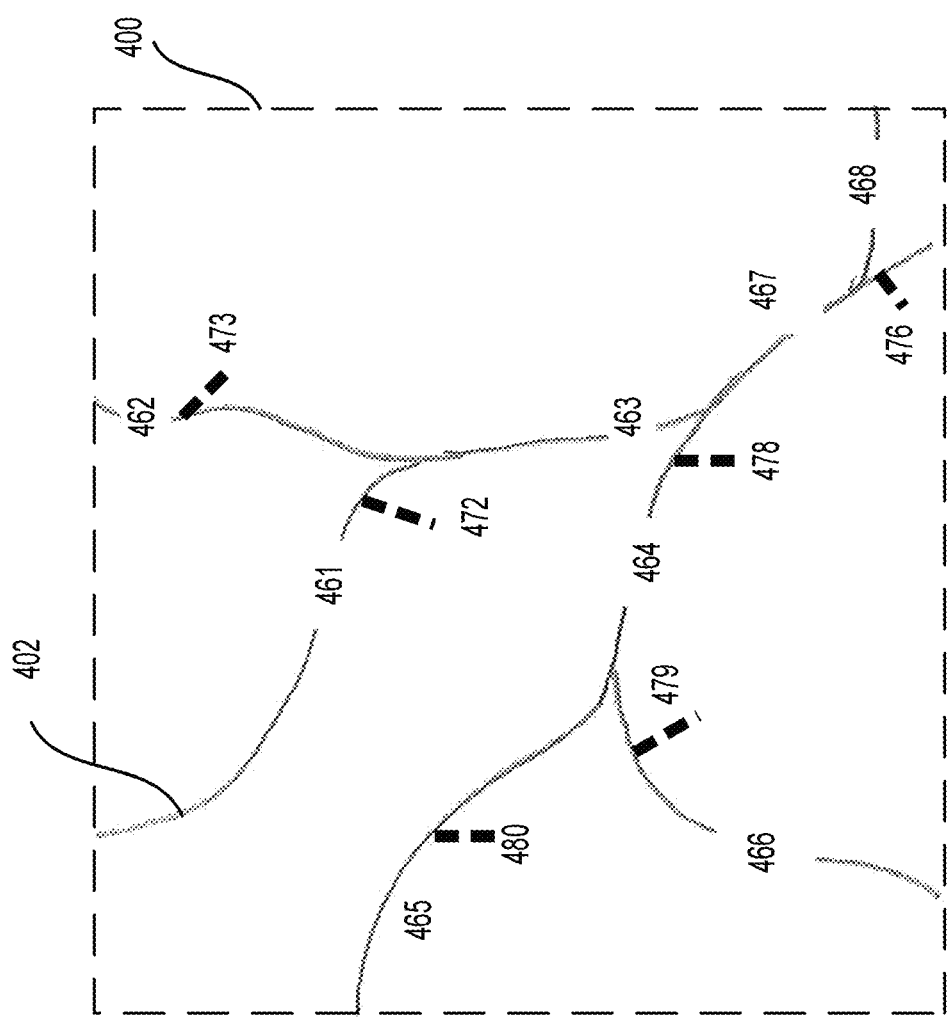
Figure 9C:
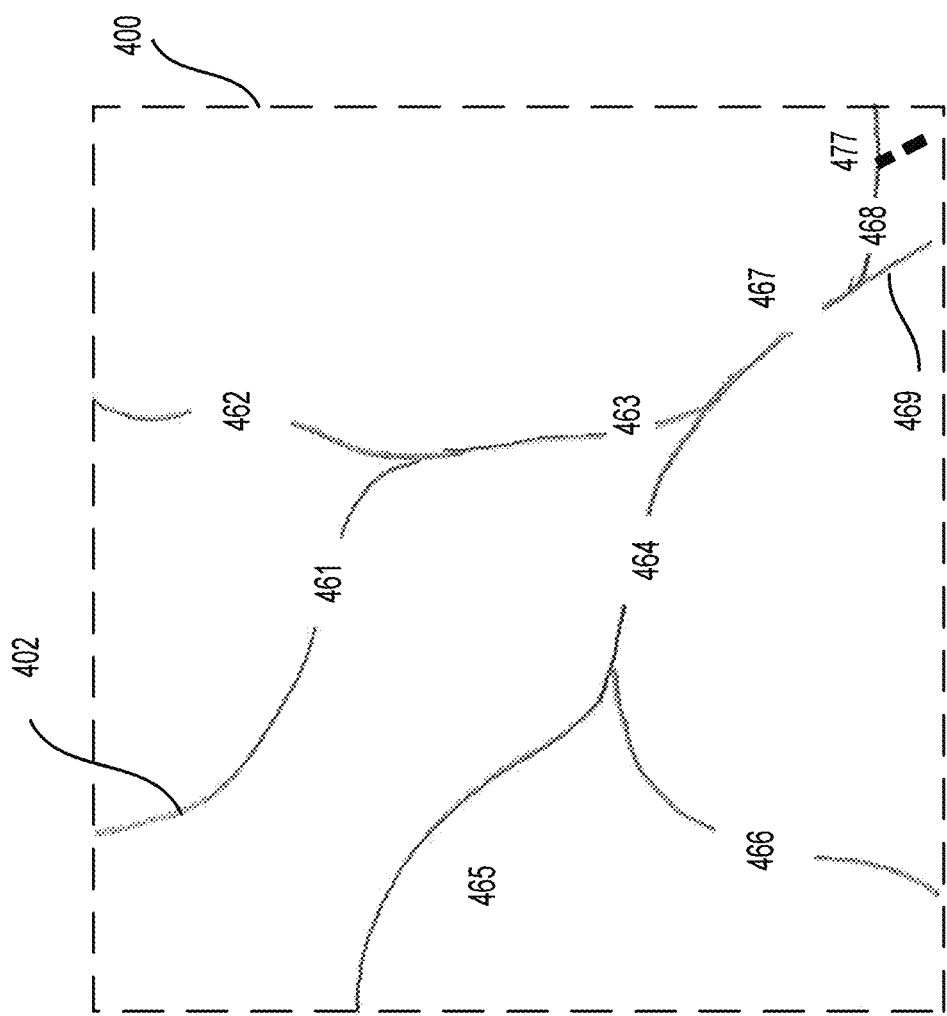
Figure 9D:
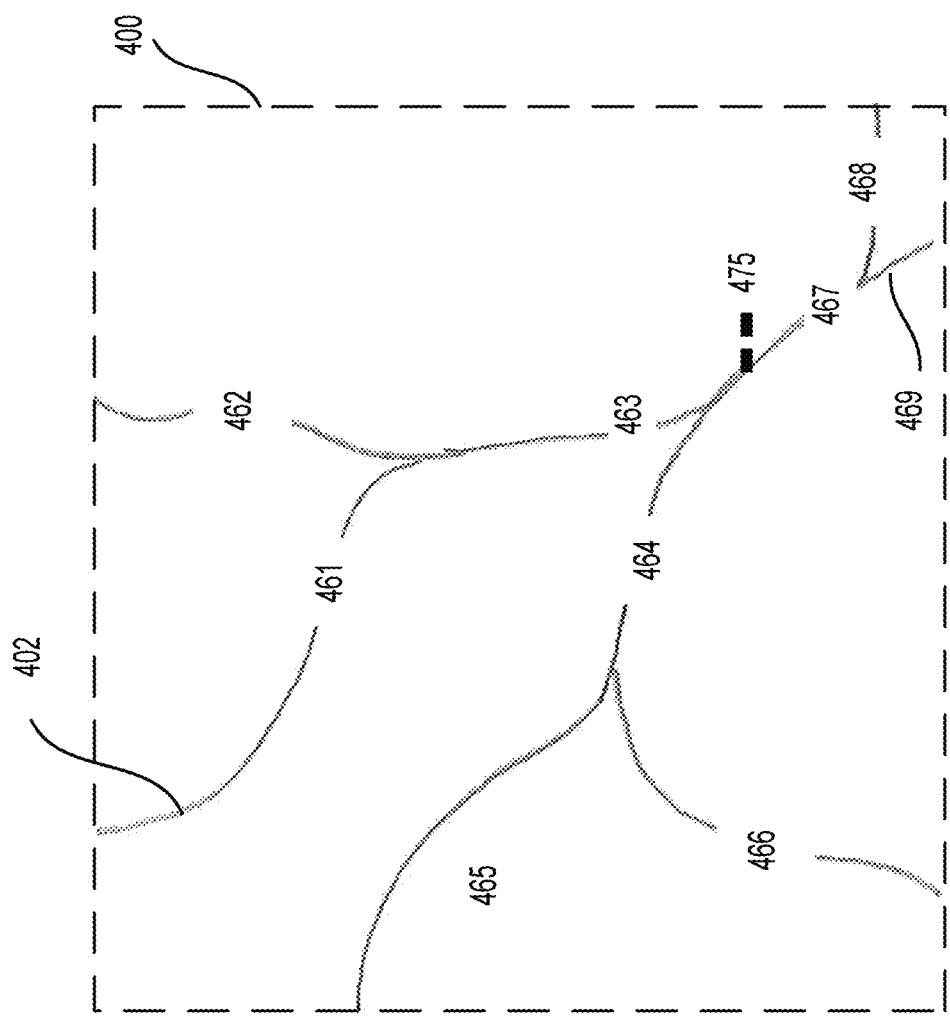

The merging achievability shown in Table 4 can also be displayed graphically. FIGS. 9A-9D show exemplary graphic displays of the merging achievability of the ramps 471-481 overlaid on the second map 402. More specifically, FIG. 9A highlights the ramps 471, 474, and 481 (dashed lines) that have the level I merging achievability. FIG. 9B highlights the ramps 472-473, 476, and 478-480 (dashed lines) that have the level II merging achievability. FIG. 9C highlights the ramp 477 (dashed line) that has the level III merging achievability. FIG. 9D highlights the ramp 475

(dashed line) that has the level IV merging achievability. The ramps 471-481 do not have the level V merging achievability. Of course, other display methods can be used to show the merge achievability, for example, by using different symbols and/or colors to represent different merge achievability.

FIG. 9E shows a histogram 910 of the merging achievability of the ramps 471-481. More specifically, numbers of the ramps for the levels I-V merging achievability are 3, 6, 1, 1, and 0, respectively.

As described above, merging achievability can depend on a merge model. FIGS. 10A-10L show various effects of merge models on the merging achievability obtained from a large number of ramps in a region (not shown). Each of the FIGS. 10A-10L shows a histogram for the level I-V merge achievability.

The first merge model is used for FIGS. 10A, 10E, and 10I in a column 1011. FIGS. 10A, 10E, and 10I correspond to merging speeds of vehicles being 0.8, 0.9, and 1 times that of speed limits of roads merged onto.

The second merge model is used for columns 1012-1014. FIGS. 10B, 10F, and 10J in the column 1012 correspond to merging speeds of vehicles being 0.8, 0.9, and 1 times that of speed limits of roads merged onto and a TD duration of 3 seconds. FIGS. 10C, 10G, and 10K in the column 1013 correspond to merging speeds of vehicles being 0.8, 0.9, and 1 times that of speed limits of roads merged onto and the TD duration of 4 seconds. FIGS. 10D, 10H, and 10L in the column 1014 correspond to merging speeds of vehicles being 0.8, 0.9, and 1 times that of speed limits of roads merged onto and the TD duration of 5 seconds.

Effects of the merge model can be seen by comparing FIGS. 10A-L. In an example, effects of the merging speed can be seen by comparing graphs within each column. For example, within each column, as the merging speed increases, a number of the level II merge achievability decreases and a number of the level V merge achievability increases. Effects of the TD duration can be seen by comparing graphs within each of rows 1021-1023 of the columns 1012-1014. For example, within each row, as the TD duration increases, a number of the level I merge achievability decreases and a number of the level V merge achievability increases.

In addition to the merge achievability levels described above, a merge distance can be determined. The merge distance can be determined differently based on, for example, different models. Referring to FIG. 7A, in certain models, the merge distance refers to a distance within which the vehicle 721A can merge onto the road 710A via the ramp 711A. In certain models, the merge distance refers to a distance between a first position where the vehicle can see the road 710A and start planning a merge maneuver and a second position where the vehicle merges onto the road 710A.

Figure 11:
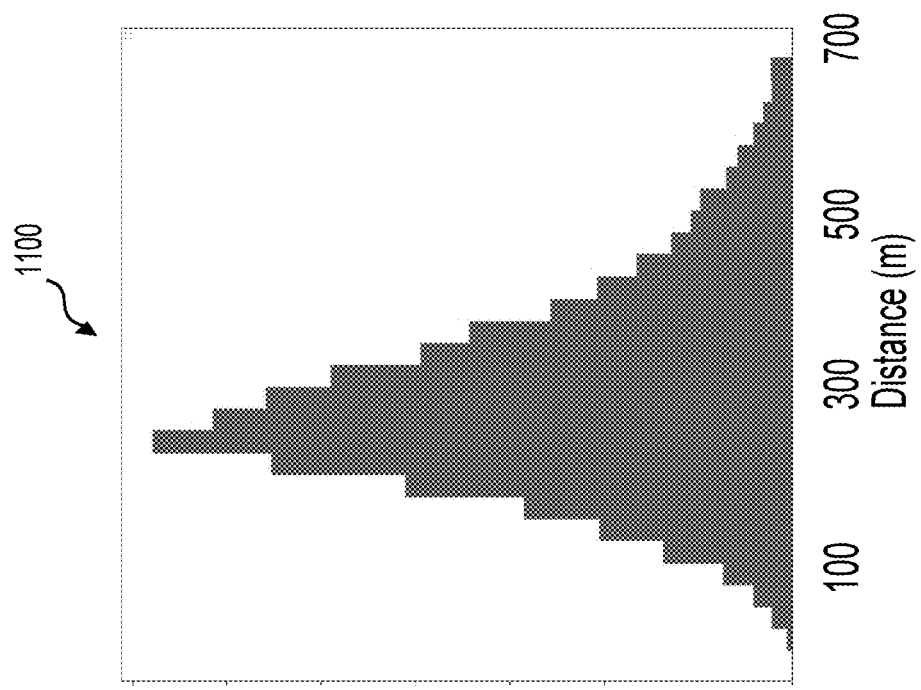
FIG. 11 shows a histogram 1100 of merge distances of a large number of ramps in a region.

FIG. 11 shows a histogram 1100 of merge distances of a large number of ramps in a region (not shown). The histogram 1100 indicates that a majority of ramps has merge distances between 100 and 550 m. In an example, a longer merge distance corresponds to a more difficult merge, e.g., the level IV merge achievability corresponds to a longer merge distance than that of the level I merge achievability.

FIG. 7B shows a diverging example 700B. A road 710B has lanes 712B-713B. In an example, the road 710B is a highway. Vehicles 722B-723B run on the lanes 712B-713B, respectively. A ramp 711B is located next to the lane 712B. A vehicle 721B diverges from the road 710B via the ramp 721B.

FIG. 7C shows a merging/diverging example 700C. A road 710C has lanes 712C-713C. In an example, the road 710C is a highway. Vehicles 722C-723C run on the lanes 712C-713C, respectively. A ramp 711C is located next to the lane 712C. In an example, the vehicle 721C can stay on the ramp 721C without merging onto the road 710C. Alternatively, the vehicle 721C can merge onto the road 710C and then diverge from the road 710C via the ramp 711C.

Figure 12:
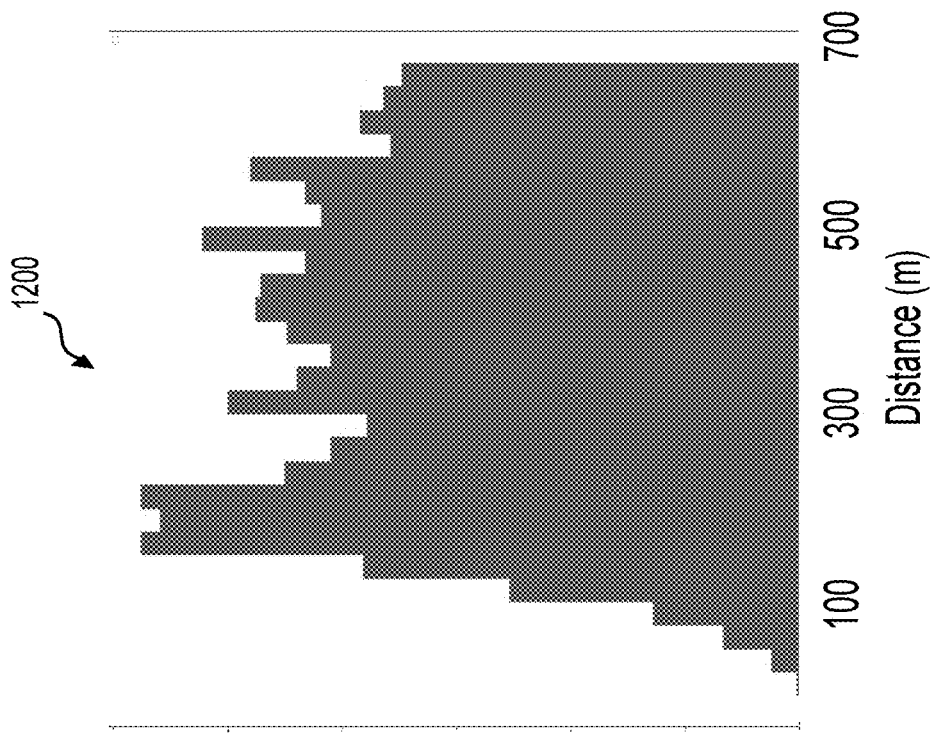
FIG. 12 shows a histogram 1200 of merge/diverge distances of a large number of ramps in a region.

FIG. 12 shows a histogram 1200 of merge/diverge distances of a large number of ramps in a region. The merge/diverge distance refers to a distance within which the vehicle 721C can merge onto and then diverge from the road 710C via the ramp 711C. Referring to FIGS. 11 and 12, an average merge/diverge distance is longer than an average merge distance.

Merging/diverging achievability of ramps can depend on a merge model. FIGS. 13A-13L show various effects of merge models on the merging/diverging achievability based on a large number of ramps in a region (not shown). Each of the FIGS. 13A-L shows a histogram for the level I-V merge achievability.

The first merge model is used for FIGS. 13A, 13E, and 13I in a column 1311. FIGS. 13A, 13E, and 13I correspond to merging speeds of vehicles being 0.8, 0.9, and 1 times that of speed limits of roads merged onto/diverge from.

The second merge model is used for columns 1312-1314. FIGS. 13B, 13F, and 13J in the column 1312 correspond to merging speeds of vehicles being 0.8, 0.9, and 1 times that of speed limits of roads merged onto/diverge from and a TD duration of 3 seconds.

FIGS. 13C, 13G, and 13K in the column 1313 correspond to merging speeds of vehicles being 0.8, 0.9, and 1 times that of speed limits of roads merged onto/diverge from and the TD duration of 4 seconds.

FIGS. 13D, 13H, and 13L in the column 1314 correspond to merging speeds of vehicles being 0.8, 0.9, and 1 times that of speed limits of roads merged onto/diverge from and the TD duration of 5 seconds.

Effects of the merge model can be seen by comparing FIGS. 13A-L. In an example, effects of the merging speed can be seen by comparing graphs within each column. For example, within each column, as the merging speed increase, a number of the level II merge/diverge achievability decreases and a number of the level I merge/diverge achievability increases. Effects of the TD duration can be seen by comparing graphs within each of rows 1321-1323 of the columns 1312-1314. For example, within each row, as the TD duration increase, numbers of the level I and II merge achievability decrease and numbers of the level IV and V merge achievability increase.

Referring back to FIG. 2, at S230, at least one route based on the road complexity can be obtained. As described above, the routing module 133 can implement the step S230 and obtain the at least one route that satisfies certain criteria. In an example, the criteria can include a length requirement such as "the route is longer than a first length, such as 1 km, and shorter than a second length, such as 10 km". The at least one route can be sent to the output interface circuitry 152 and/or the communication devices 170. The process 200 proceeds to S299, and terminates.

The process 200 can be applied to any roads or connected roads having any suitable length. For example, lengths of the connected roads can be above the first threshold, such as 100 m, 500 m, 1 km, or the like. In an example, a length of a road or a connected road can have an order of magnitude of 100 miles. The process 200 can be applied to any region, such as multiple countries, the United States, a portion of the United State, or the like. The process 200 can also be adapted. In various examples, the second map 402 can also include one or more road segments are not connected. The first map 401 can also be divided recursively where one or more of the first sub-maps 401A-D are further divided into smaller maps.

Figure 3:
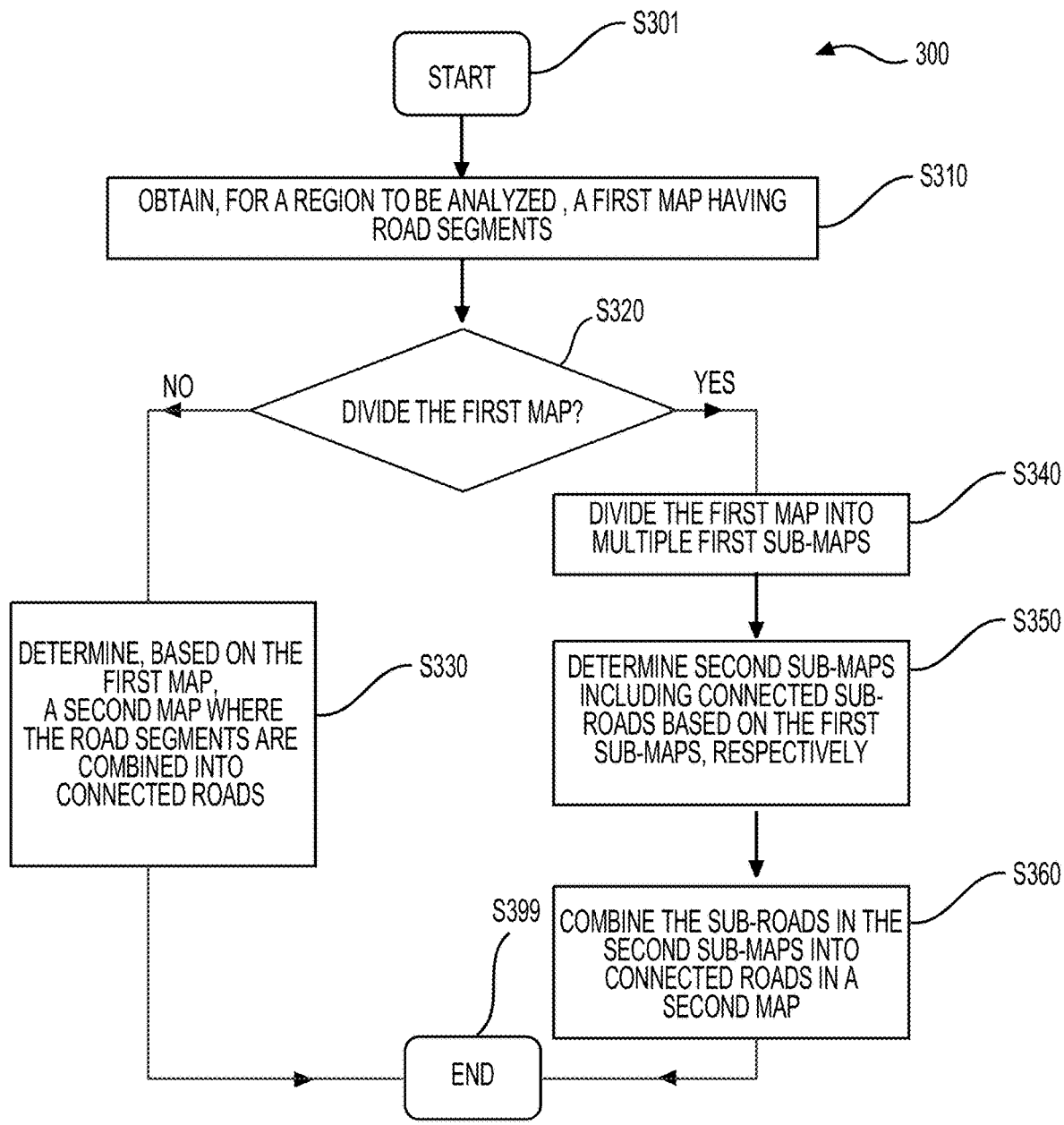
FIG. 3 is a flowchart outlining an exemplary process 300 according to the present disclosure.

FIG. 3 is a flowchart outlining an exemplary process 300 implemented using, for example, the apparatus 100 or the connection module 131 as shown in FIG. 1. The process 300 can be used to combine a plurality of short road segments in a first map into a connected road in a second map. The process 300 starts at S301 and proceeds to S310.

At S310, a first map having road segments can be obtained for a region to be analyzed. Lengths of the road segments can be less than the first threshold, such as 100 m. The first map can be a HD map.

At S320, whether to divide the first map is determined, for example, based on a size of the region, a number of the road segments in the first map, and/or the like. In an example, when the number of the road segments exceeds the number threshold, the first map is divided and the process 300 proceeds to S340. Otherwise, the first map remains undivided, and the process 300 proceeds to S330.

At S330, the second map is determined based on the first map by combining the road segments in the first map into connected roads in the second map. For example, referring to FIGS. 4A and 4D, the road segments 411-437 in the first map 401 are combined into the connected roads 461-469 in the second map 402.

A suitable order can be used to connect the road segments 411-437 into the connected roads 461-469. In an example, a connected road, such as the connected road 461 starts from a dead end in the first map 401, e.g., the road segment 411, that is also a first end of the connected road 461. A number of road segments (i.e., the road segment 412) adjacent to the road segment 411 can be determined. When the number is equal to 1, the connected road 461 includes the road segment 412. The above process can be implemented iteratively for the road segments 413-415, and thus the connected road 461 is also determined to include the road segments 413-415. When a number of road segments (i.e., the road segments 418-419) adjacent to the road segment 415 is determined to be larger than 1, the road segment 415 is determined to be at a second end of the connected road 461. Accordingly, the connected road 461 includes the first end 411, the second end 415, and the road segments 412-414 between the first and second ends 411 and 415.

Another connected road can start from a new first end. The new first end can be the road segment 418 or 419 that is adjacent to the road segment 415. Alternatively, the new first end can be a dead end 416 of the first map 401. Similar methods used to form the connected road 461 can be used to determine the other connected road.

The order to connect the road segments 411-437 into the connected roads 461-469 can be from a dead end (e.g., the road segment 411) of the first map 401 to a center (e.g., the road segment 415) of the first map 401. The order can also be from a center (e.g., the road segment 418) of the first map 401 to a dead end (e.g., the road segment 416). The order can also be from one center (e.g., the road segment 419) to another center (e.g., the road segment 421). The order can also be from one dead end to another dead end (not shown). One or more orders can be combined to connect the road segments 411-437 in the first map 401. The process 300 proceeds to S399, and terminates. Lengths of the connected roads can be longer than the first threshold.

In an example, when the number of the road segments is large, the step S330 can take a long time to implement. An alternative method using steps S340, S350, and S360 is described below.

At S340, the first map is divided into multiple first sub-maps. The first map can be divided into a suitable number of the first sub-maps, such as 2, 3, or the like. Sub-regions for the first sub-maps can have suitable sizes and shapes. In the example shown in FIG. 4B, the first map 401 is divided into the 4 first sub-maps 401A-D having a same size and a same shape.

At S350, second sub-maps are determined based on the first sub-maps, respectively. The second sub-maps include sub-roads that are formed by combining a plurality of road segments in the respective first sub-maps, as described with reference to FIGS. 4B-4C. The second sub-maps 402A-D can be determined in a parallel process from the respective first sub-maps 401A-D, thus can be determined faster than determining the second map 402 directly from the first map 401. As described above, the first map 401 includes the dead ends 411, 416, 426, 428, 429, and 437 and the connected road segments, such as the road segments 412-415. When the first map 401 is divided into the 4 first sub-maps 401A-D, a subset of the connected road segments in the first map 401 becomes dead ends in the respective first sub-maps 401A-D. More specifically, the connected road segments 413 and 436, 414 and 419, 435 and 432, and 420 and 433 in the first map 401 become the dead ends in the respective first sub-maps 401A-D.

Within each first sub-map, an order to connect road segments into connected sub-roads can be from a dead end of the first sub-map to a center of the first sub-map, from a dead end of the first sub-map to another dead end of the first sub-map, from a center to a dead end of the first sub-map, and from a center to another center of the first sub-map. Accordingly, referring to FIG. 4C, the sub-roads 441-442 are determined for the second sub-map 402A; the sub-roads 443-444 are determined for the second sub-map 402B; the sub-road 445 is determined for the second sub-map 402C; and the sub-roads 446-450 are determined for the second sub-map 402D. As described above, the road segment 419 remains unconnected in the second sub-map 402B, and the road segments 432 and 435 remain unconnected in the second sub-map 402C.

At S360, the sub-roads in the second maps are combined into connected roads in the second map. Multiple sub-roads across multiple sub-maps can be combined into a connected road via the respective dead ends in the multiple sub-maps. For example, the sub-road 441 in the second sub-map 402A and the sub-road 444 in the second sub-map 402B are combined into the connected road 461 via the dead ends 413 and 414 in the second sub-map 402A-402B, respectively. In various examples, one or more of the connected roads can also include one or more of the road segments that are not connected to a connected sub-road in a first sub-map. The road segment 419 in the second sub-map 402B and the sub-road 446 in the second sub-map 402D are combined into the connected road 463 via the dead ends 419-420 in the second sub-map 402B and 402D, respectively. The sub-road 442 in the second sub-map 402A and the road segment 435 in the second sub-map 402C are combined into the connected road 465 via the dead ends 436 and 435, respectively. The road segment 432 in the second sub-map 402C and the sub-road 447 in the second sub-map 402D are combined into the connected road 464 via the dead ends 432-433. The process 300 proceeds to S399, and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus comprising:
interface circuitry configured to obtain a first map of a region having road segments, the first map including first nodes located at edges of the first map, second nodes separating two adjacent road segments, and third nodes separating more than two adjacent road segments;
processing circuitry configured to:
connect adjacent road segments that are separated by the second nodes and are not separated by the third nodes to form respective connected roads, an end of each of the connected roads being one of (i) the first nodes and (ii) the third nodes, a length of one of the connected roads being longer than a threshold, the threshold being selected to allow for curve information to be determined accurately in the connected road, wherein curve information could not have been determined accurately using the individual road segments that were connected to form the connected road;
determine, based on the first map having the road segments, a second map having the connected roads;
determine road complexity of one of the connected roads in the second map for route planning and testing, the road complexity including curve information and one of: ramp information, lane information, orientation information, hill information, tunnel information, and speed limit information of the one of the connected roads; and
control a vehicle to move along a particular route and to test the vehicle in operation, based on the determined road complexity; and
memory to store the road complexity of the one of the connected roads.

2. The apparatus of claim 1, wherein lengths of the road segments are shorter than the threshold.

3. The apparatus of claim 1, wherein the processing circuitry is further configured to:
determine whether the first map is to be divided; and
when the first map is determined to be divided,
divide the first map into multiple first sub-maps;
determine, based on the first sub-maps, second sub-maps by connecting the road segments into connected sub-roads; and
combine the connected sub-roads in the second sub-maps to form the connected roads in the second map.

4. The apparatus of claim 3, wherein the processing circuitry is configured to determine whether the first map is to be divided based on at least one of: a number of the road segments and a size of the region.

5. The apparatus of claim 1, wherein
the one of the connected roads includes a ramp; and
the processing circuitry is further configured to determine merge achievability for the ramp based on the road complexity of the one of the connected roads and information of a vehicle to merge onto the one of the connected roads.

6. The apparatus of claim 5, wherein the processing circuitry is further configured to implement a merge model that includes a transition period when the vehicle is controlled by a driver of the vehicle and an automatic period when the vehicle is controlled automatically.

7. The apparatus of claim 5, wherein the road complexity includes a ramp distance and a speed limit of the one of the connected roads, and the information of the vehicle includes a maximum speed of the vehicle and a maximum acceleration of the vehicle.

8. The apparatus of claim 1, wherein the processing circuitry is further configured to obtain at least one route based on the road complexity.

9. A method, comprising:
obtaining, by interface circuitry of an apparatus, a first map of a region having road segments, the first map including first nodes located at edges of the first map, second nodes separating two adjacent road segments, and third nodes separating more than two adjacent road segments;
connecting, by processing circuitry of the apparatus, adjacent road segments that are separated by the second nodes and are not separated by the third nodes to form respective connected roads, an end of each of the connected roads being one of (i) the first nodes and (ii) the third nodes, a length of one of the connected roads being longer than a threshold, the threshold being selected to allow for curve information to be determined accurately in the connected road, wherein curve information could not have been determined accurately using the individual road segments that were connected to form the connected road;
determining, based on the first map having the road segments, a second map having the connected roads;
determining road complexity of one of the connected roads in the second map for route planning and testing, the road complexity including curve information and one of: ramp information, lane information, orientation, information, hill information, tunnel information, and speed limit information of the one of the connected roads;
controlling a vehicle to move along a particular route and to test the vehicle in operation, based on the determined road complexity; and
storing the road complexity of the one of the connected roads in memory of the apparatus.

10. The method of claim 9, wherein lengths of the road segments are shorter than the threshold.

11. The method of claim 9, wherein determining the second map further comprises:
determining whether the first map is to be divided; and
when the first map is determined to be divided,
dividing the first map into multiple first sub-maps;
determining, based on the first sub-maps, second sub-maps by connecting the road segments into connected sub-roads; and
combining the connected sub-roads in the second sub-maps to form the connected roads in the second map.

12. The method of claim 11, wherein determining whether the first map is to be divided further comprises determining whether the first map is to be divided based on at least one of: a number of the road segments and a size of the region.

13. The method of claim 9, wherein
the one of the connected roads includes a ramp; and
determining the road complexity further comprises determining merge achievability for the ramp based on the road complexity of the one of the connected roads and information of a vehicle to merge onto the one of the connected roads.

14. The method of claim 13, wherein determining the road complexity comprises implementing a merge model that includes a transition period when the vehicle is controlled by a driver of the vehicle and an automatic period when the vehicle is controlled automatically.

15. The method of claim 9, further comprising:
obtaining at least one route based on the road complexity.

16. A non-transitory computer readable storage medium having instructions stored thereon that when executed by processing circuitry causes the processing circuitry to perform a method, the method comprising:
  obtaining a first map of a region having road segments, the first map including first nodes located at edges of the first map, second nodes separating two adjacent road segments, and third nodes separating more than two adjacent road segments;
  connecting adjacent road segments that are separated by the second nodes and are not separated by the third nodes to form respective connected roads, an end of each of the connected roads being one of (i) the first nodes and (ii) the third nodes, a length of one of the connected roads being longer than a threshold, the threshold being selected to allow curve information to be determined accurately in the connected road, wherein curve information could not have been determined accurately using the individual road segments that were connected to form the connected road;
  determining, based on the first map having the road segments, a second map having the connected roads;
  determining road complexity of one of the connected roads in the second map for route planning and testing, the road complexity including curve information and one of: ramp information, lane information, orientation information, hill information, tunnel information, and speed limit information of the one of the connected roads;
  controlling a vehicle to move along a particular route and to test the vehicle in operation, based on the determined road complexity; and
  storing the road complexity of the one of the connected roads.

\* \* \* \* \*